(12) United States Patent
Krishnan et al.

(10) Patent No.: US 7,730,180 B1
(45) Date of Patent: *Jun. 1, 2010

(54) RESOLVING MULTIPLE MASTER NODE CONFLICT IN A DDB

(75) Inventors: Sriram Krishnan, Westborough, MA (US); Gregory W. Lazar, Upton, MA (US)

(73) Assignee: EMC Corporation, Hopkinton, MA (US)

( * ) Notice: Subject to any disclaimer, the term of this patent is extended or adjusted under 35 U.S.C. 154(b) by 47 days.

This patent is subject to a terminal disclaimer.

(21) Appl. No.: 11/880,325

(22) Filed: Jul. 20, 2007

Related U.S. Application Data

(63) Continuation of application No. 09/964,977, filed on Sep. 27, 2001, now Pat. No. 7,269,648.

(51) Int. Cl.
*G06F 15/173* (2006.01)
(52) U.S. Cl. .................................. 709/224; 709/223
(58) Field of Classification Search .................. 709/224
See application file for complete search history.

(56) References Cited

U.S. PATENT DOCUMENTS

| | | | | |
|---|---|---|---|---|
| 5,289,176 A | * | 2/1994 | Novakovich et al. | 370/254 |
| 5,313,465 A | * | 5/1994 | Perlman et al. | 370/254 |
| 5,511,188 A | * | 4/1996 | Pascucci et al. | 707/203 |
| 5,608,903 A | * | 3/1997 | Prasad et al. | 707/10 |
| 5,708,812 A | * | 1/1998 | Van Dyke et al. | 717/171 |
| 5,768,519 A | * | 6/1998 | Swift et al. | 709/223 |
| 5,805,072 A | * | 9/1998 | Kakemizu | 370/408 |
| 5,805,785 A | * | 9/1998 | Dias et al. | 714/4 |
| 5,805,786 A | * | 9/1998 | Badovinatz et al. | 714/4 |
| 5,844,900 A | * | 12/1998 | Hong et al. | 370/342 |
| 5,968,121 A | * | 10/1999 | Logan et al. | 709/219 |
| 5,987,011 A | * | 11/1999 | Toh | 370/331 |
| 6,081,898 A | * | 6/2000 | Miller et al. | 726/1 |
| 6,092,214 A | * | 7/2000 | Quoc et al. | 714/4 |
| 6,115,713 A | * | 9/2000 | Pascucci et al. | 707/10 |
| 6,181,689 B1 | * | 1/2001 | Choung et al. | 370/352 |
| 6,199,169 B1 | * | 3/2001 | Voth | 713/400 |
| 6,243,826 B1 | * | 6/2001 | Quoc et al. | 714/4 |
| 6,292,905 B1 | * | 9/2001 | Wallach et al. | 714/4 |
| 6,295,541 B1 | * | 9/2001 | Bodnar et al. | 707/203 |
| 6,324,571 B1 | * | 11/2001 | Hacherl | 709/208 |
| 6,363,416 B1 | * | 3/2002 | Naeimi et al. | 709/209 |

(Continued)

*Primary Examiner*—Benjamin R Bruckart
*Assistant Examiner*—Alicia Baturay
(74) *Attorney, Agent, or Firm*—Krishnendu Cupta; Robert Kevin Perkins; Joel Wall

(57) ABSTRACT

In a multinode computer network, a directory database (DDB) in each of the nodes, contents of the DDB being replicated throughout the network through use of one of its nodes having been appointed as master node. The master node updates each DDB in each node in its network or domain configuration when the configuration changes. A global administrator has authority to replace or select a master node and to configure a domain, and performs these and other functions by way of computer terminal screen dialogs offered by a graphical user interface (GUI) associated with the computer network. In the case of multiple master nodes attempting to be master for the same nodes in the same network at the same time, this conflict is resolved in one embodiment of the present invention by allowing the most recently selected purported master node to be the actual master node. After resolution of this conflict the result is communicated by the prevailing master node to all nodes in the network. This resolution takes into account a global network with varying time zones, and further takes into account the remote possibility of a simultaneous appointment of two masters.

3 Claims, 14 Drawing Sheets

MASTER CONFLICT

U.S. PATENT DOCUMENTS

| | | | |
|---|---|---|---|
| 6,381,627 B1 * | 4/2002 | Kwan et al. | 709/201 |
| 6,450,298 B1 * | 9/2002 | Koura et al. | 187/247 |
| 6,466,608 B1 * | 10/2002 | Hong et al. | 375/137 |
| 6,611,860 B1 * | 8/2003 | Ying | 709/208 |
| 6,665,730 B1 * | 12/2003 | Michelson et al. | 709/238 |
| 6,680,903 B1 * | 1/2004 | Moriguchi et al. | 370/216 |
| 6,691,173 B2 * | 2/2004 | Morris et al. | 709/249 |
| 6,732,202 B1 * | 5/2004 | Ying | 710/62 |
| 6,751,634 B1 * | 6/2004 | Judd | 707/200 |
| 6,751,719 B1 * | 6/2004 | Peloquin et al. | 711/210 |
| 6,823,429 B1 * | 11/2004 | Olnowich | 711/141 |
| 6,829,487 B2 * | 12/2004 | Eiden et al. | 455/519 |
| 6,877,043 B2 * | 4/2005 | Mallory et al. | 709/251 |
| 6,915,309 B1 * | 7/2005 | Conley et al. | 707/104.1 |
| 6,941,350 B1 * | 9/2005 | Frazier et al. | 709/209 |
| 7,054,910 B1 * | 5/2006 | Nordin et al. | 709/208 |
| 7,120,690 B1 * | 10/2006 | Krishnan et al. | 709/225 |
| 7,269,648 B1 * | 9/2007 | Krishnan et al. | 709/224 |
| 2002/0044549 A1 * | 4/2002 | Johansson et al. | 370/386 |
| 2002/0080807 A1 * | 6/2002 | Lind | 370/412 |
| 2003/0149735 A1 * | 8/2003 | Stark et al. | 709/208 |
| 2005/0055418 A1 * | 3/2005 | Blanc et al. | 709/209 |
| 2005/0063313 A1 * | 3/2005 | Nanavati et al. | 370/252 |
| 2005/0102704 A1 * | 5/2005 | Prokupets et al. | 725/118 |
| 2005/0114401 A1 * | 5/2005 | Conkel | 707/200 |
| 2005/0163133 A1 * | 7/2005 | Hopkins | 370/400 |
| 2005/0182942 A1 * | 8/2005 | Calin | 713/182 |
| 2007/0081535 A1 * | 4/2007 | Li | 370/392 |

* cited by examiner

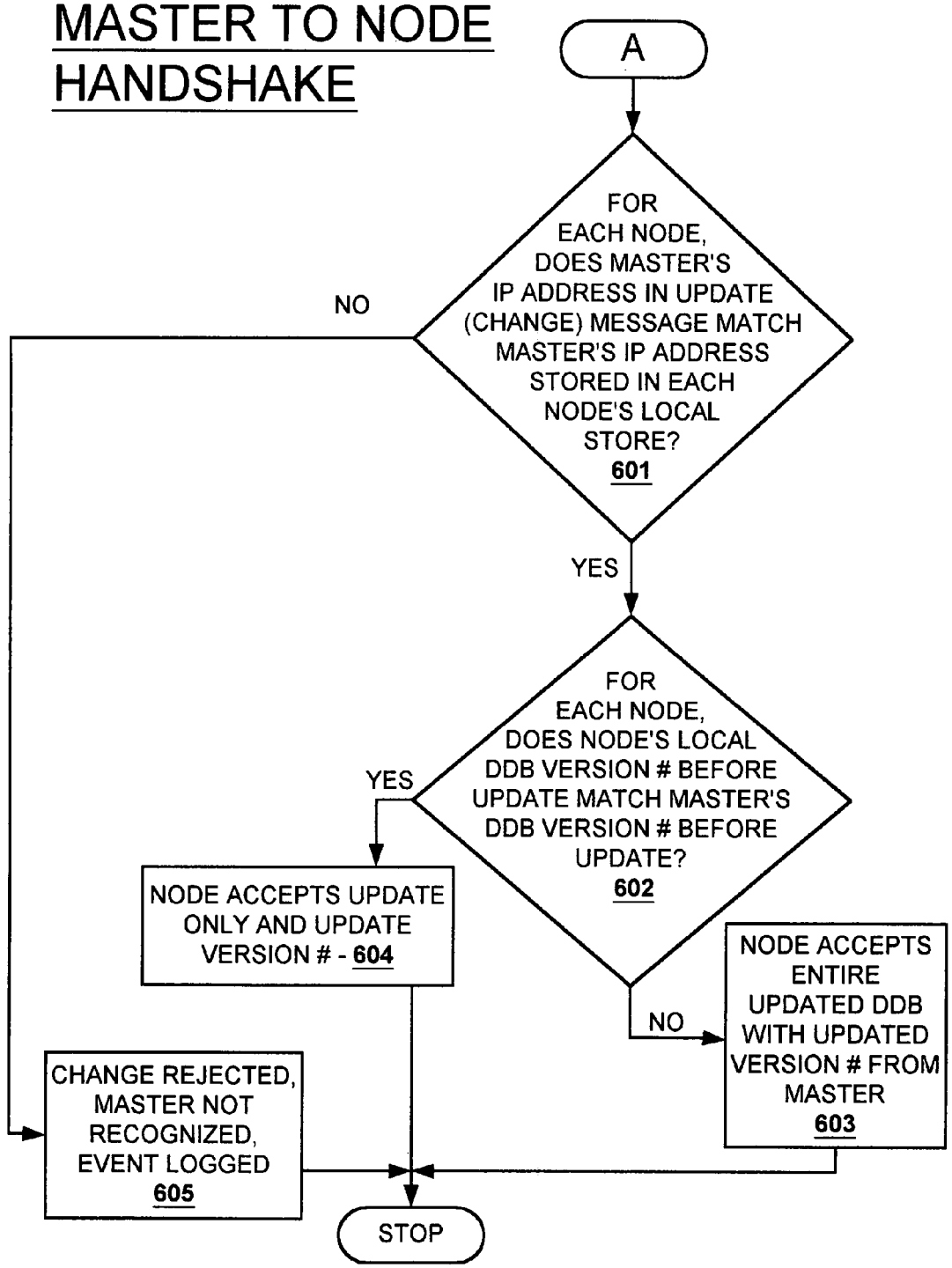

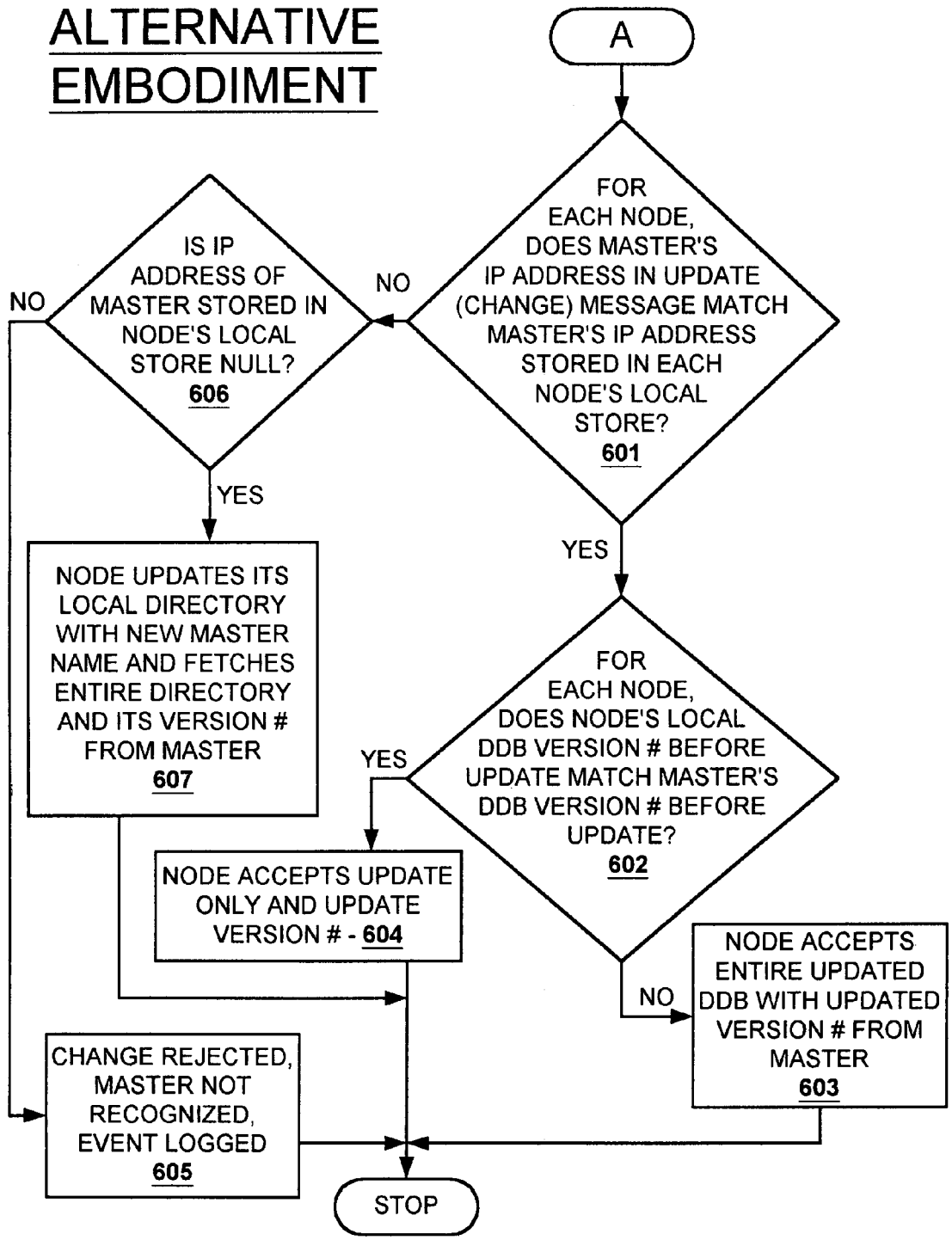

NODE TO MASTER HANDSHAKE

SELECT MASTER

Master Node IP Address

| 128 | . | 221 | . | 34 | . | 187 |

Master Candidate Nodes

| NODE INFORMATION | SYSTEM NAME | PROVIDER INFORMATION |
|---|---|---|
| 128. 221.42. 58 (CPC4258) | ARRAY 3 | DIRECTORY PROVIDER (VER6.0.0.1) |
| 128. 221.34.187 (CPC34187) | ARRAY 2 | DIRECTORY PROVIDER (VER6.0.0.1) |
| 128. 221.34. 63 (CPC3463) | ARRAY 1 | CLARIION PROVIDER (VER6.0.0.1) |

OK   APPLY   CANCEL   HELP

FIGURE 8

CONFIGURE DOMAIN  [X]

Domain Name
DefaultDomain    [Change]

Scan Subnets

Subnets To Add:     Subnets To Scan:

[10.14.12]  A   | 128.221.34 |    [Scan]
                | 128.221.42 |
                | 10.14.12   |    [Stop Scan]

0%------p-r-o-g-r-e-s-s b-a-r--------100%    [Clear]

Select Systems

IP Address of System              Selected Systems

[128.221.34.16]   B

| System | Node Info |
|--------|-----------|
| cpc4258 | 128.221.42.58 |
| cpc34187 | 128.221.34.187 |
| cpc3463 | 128.221.34.63 |

Available Systems:    C

| System | Node Info |
|--------|-----------|
| Cadsys | 128.221.34.80 |
| 00-0000 | 128.221.42.64 |
| Randy | 128.221.42.80 |
| Bandy | 128.221.42.122 |
| lbb12105 | 10.14.12.105 |

D

[Clear]

[OK]  [APPLY]  [CANCEL]  [HELP]

FIGURE 9

MASTER CONFLICT

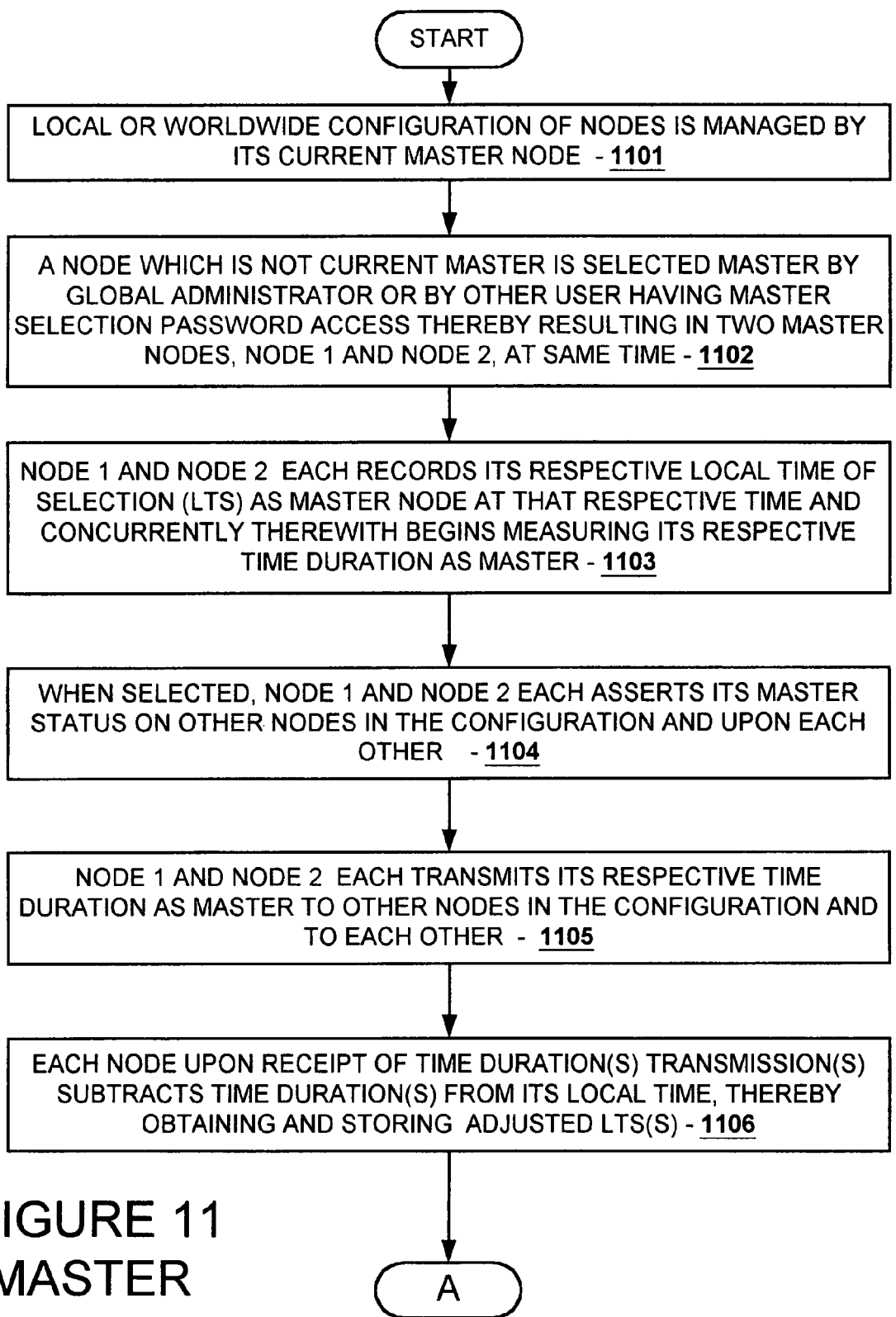
FIGURE 11 (MASTER CONFLICT)

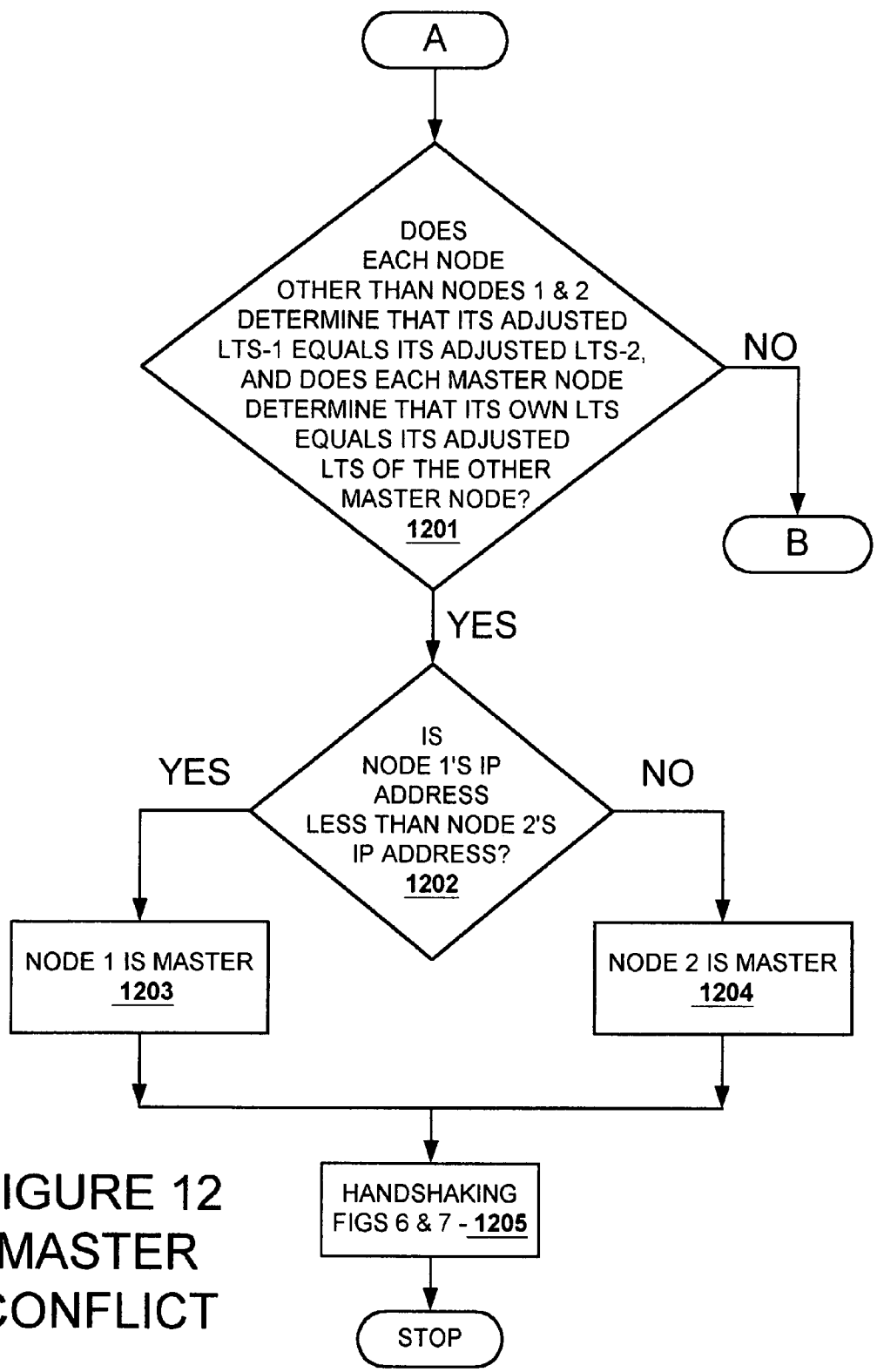
FIGURE 12 MASTER CONFLICT

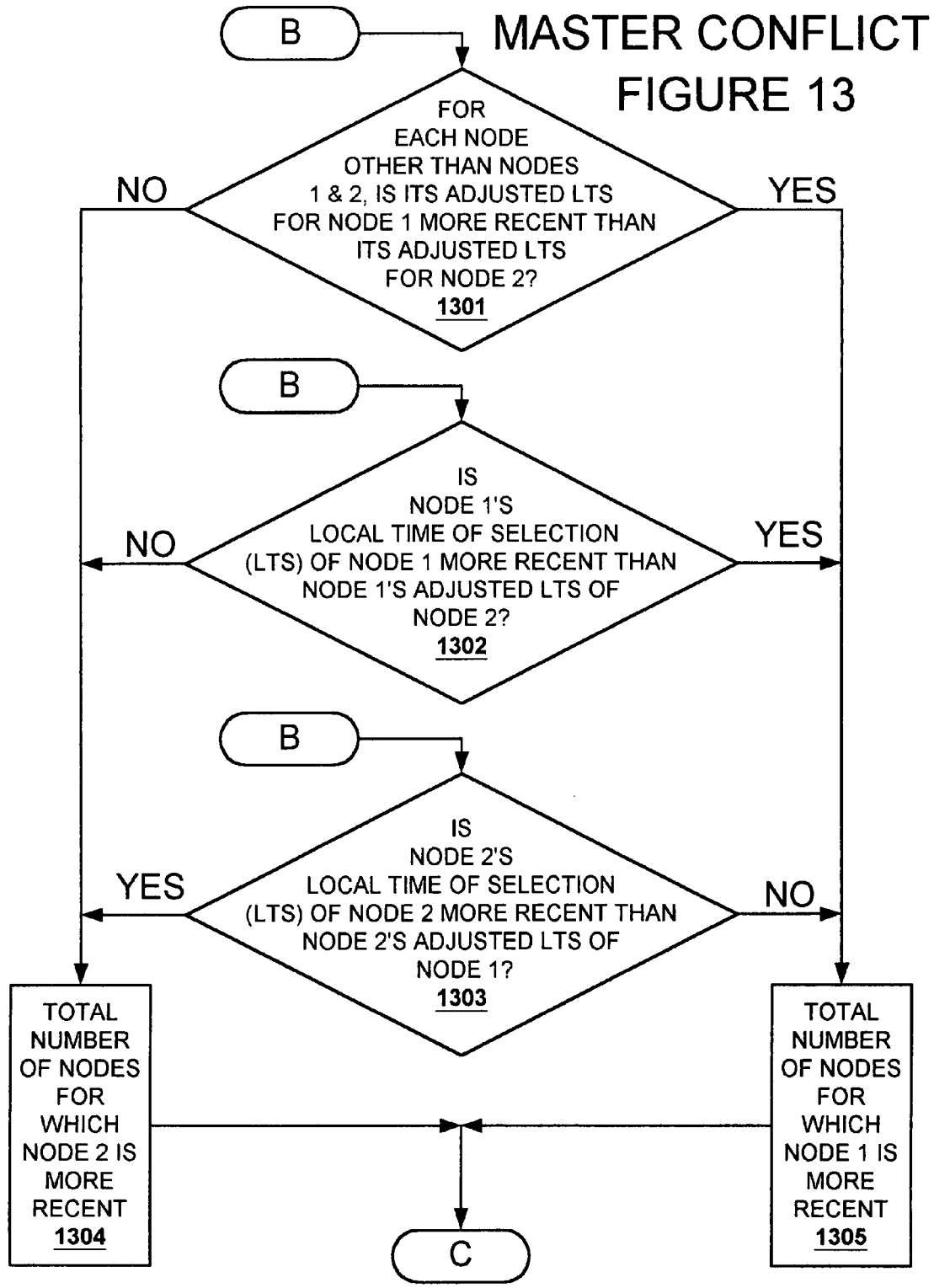

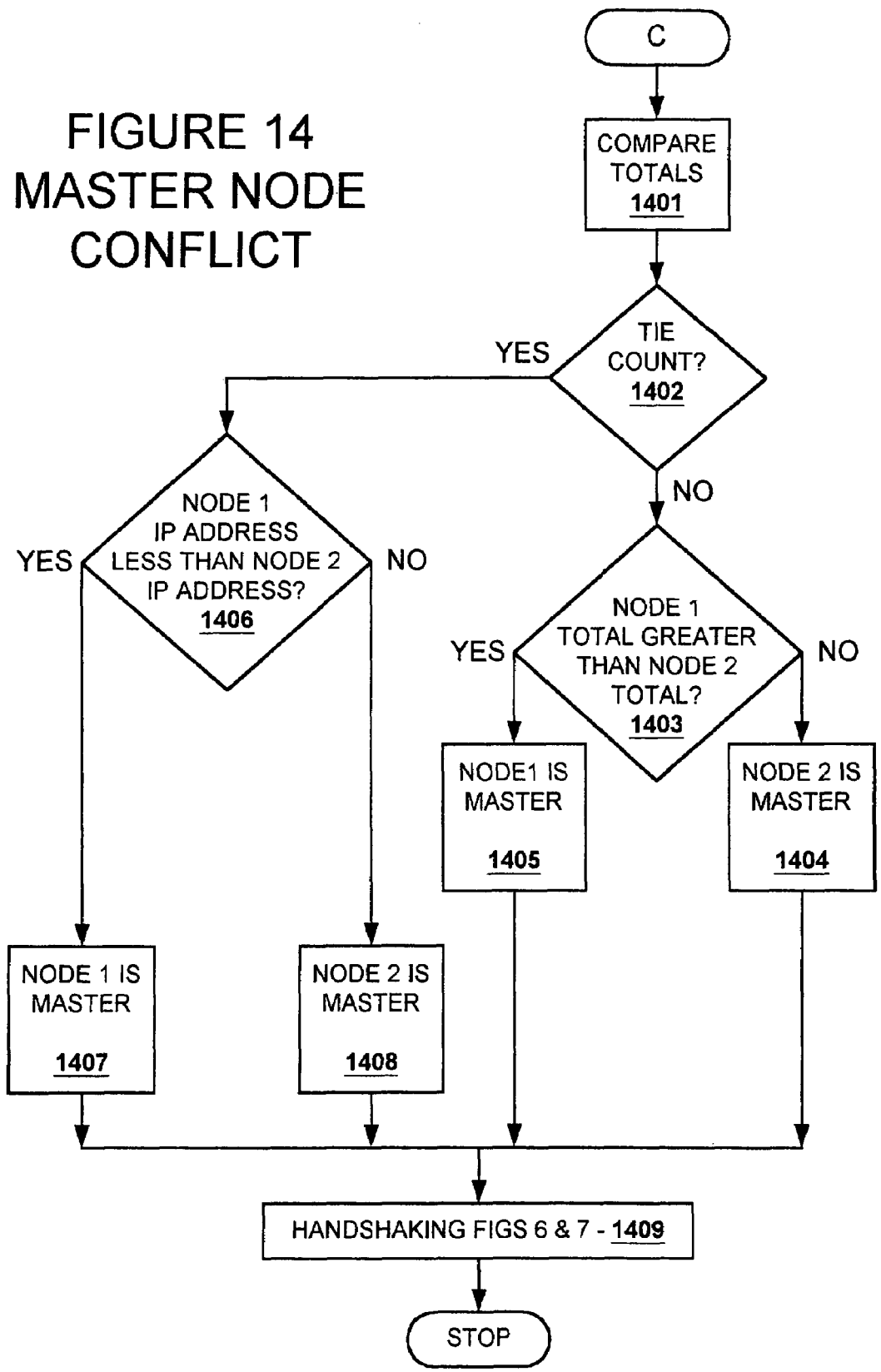

RESOLVING MULTIPLE MASTER NODE CONFLICT IN A DDB

This patent application is a continuation application, filed under 37 C.F.R. §1.53(b)(1), of prior non-provisional parent application Ser. No. 09/964,977, filed Sep. 27, 2001 now U.S. Pat. No. 7,269,648, entitled: "RESOLVING MULTIPLE MASTER NODE CONFLICT IN A DDB." This patent application has the same inventors as those of the parent application, and has its assignee in common with that of the parent application. Benefits under Title 35 United States Code section 120 (35 U.S.C. §120) are hereby claimed.

CROSS REFERENCE TO RELATED APPLICATIONS

This patent application relates to another patent application filed on even date herewith having co-inventors Sriram Krishnan, Andreas L. Bauer, and Gregory W. Lazar, assignee in common with this patent application, the title of "Managing a Distributed Directory Database", and which is incorporated by reference herein in its entirety.

BACKGROUND OF THE INVENTION

1. Field of the Invention

The present invention relates to apparatus, methodology, systems, and/or computer program product for resolving multiple master conflict in a directory database (DDB) and, more particularly, relates to resolving multiple master conflict in a globally-distributed DDB within a computer network environment such as a client server network.

2. Description of Prior Art

As may be observed by even the most casual computer system user, computer networks appear to be continuously evolving into ever-more sophisticated communication systems. Accordingly, computer networks are having an ever-increasing impact on modern-day lifestyle for many people, as the Internet is demonstrating. Computer networks include local area networks (LANs) such as might be encountered within a singular and localized corporate business organization where corporate functions (engineering, marketing, sales, advertising, human resources, etc.) are linked together in a localized computer network. Computer networks also include wide area networks (WANs) such as might be encountered within a corporate business organization that is nationwide or even worldwide in scope. The Internet is the premier example of a WAN, but is one that is obviously not constrained within any particular business organization and allows access to virtually any organization or individual. It is widely understood that these networks not only utilize hard-wire bus communication paths to accomplish their objectives, but can also utilize wireless telecommunication links via satellites and the like as well.

Computer network configurations usable within LANs and WANs include client-server network configurations. A client or workstation (typically having a user interface) can be networked to multiple servers which serve the client in a variety of ways. Such a client-server computer network configuration can be particularly useful in certain applications, such as in managing a computer data storage system. A client-server network can be used with the Internet. Thus, quality of operation of a storage system within a client-server network operatively coupled over the Internet not only can impact quality of performance of that client-server computer network, but can also impact quality of service received by multiple human users connected through the Internet to that client-server network. A failed or degraded storage system thus can escalate into a failed or degraded service for multiple human users.

A client-server network today may typically be based on an object oriented computer system which means that such system employs one or more object-oriented computer languages such as C++, XML (eXtensible Markup Language), JAVA, and/or others. Briefly, an object, in computer software terms, also referred to as a "node", is a dedicated area of memory which can be thought of as an impervious container holding both data and instructions within itself, both defining itself and its relationships to other objects in the computer system or network. Such object or node can send and receive messages to and from other objects, respond and react to such messages (e.g. commands) but shall normally be impervious to internal scrutiny. For example, in the above-noted computer data storage system (a kind of computer) each object (system object) may describe or relate to a specific tangible detail in the storage system or in the storage system's processor (e.g., details such as those describing or relating to aspects of operation of the processor's cooling-fan, power switch, cache memory, power supply, disk drive interface, etc.). These tangible objects (nodes) in the storage system can send messages to each other within the storage system and to other objects outside the storage system over the network with which they are operatively coupled. Also, the storage system itself can be an object and interact as a node with other nodes in a network.

The relationship between and amongst these specific objects in the storage system is usually visualized or characterized as a "tree" of objects. In a tree, each such object hangs off a preceding object as if in a parent-child or inheritance relationship, with many children hanging from a parent not being an atypical configuration. In addition to these tangible kinds of objects, logical units (LUNs) are other nodes or objects that can be contained within the tree. For example, a storage system object can have several LUN objects as its children which, in turn, can have various disk objects as their children, etc. These kinds of objects are generically referred to herein as "system objects" since they all relate to a system or to components within a system, whether it is a storage system, computer system, disk drive system, or some other system, and representations of these objects can typically be displayed on a computer terminal's graphical user interface (GUI) in this tree fashion. However, in contrast, other kinds of objects (nodes) can also be formulated which do not relate to a system or its components per se, such as objects relating to user actions and represented on the GUI in other ways. (User actions are any commands or operations initiated by the user, such as, for example, creating a LUN or downloading new software to a disk, etc.). In addition, there can be yet other kinds of network nodes beyond the two types mentioned such as nodes comprising or represented by a communication tree.

Accordingly, it shall be appreciated that there can be a very large number of nodes of various kinds or "personalities" to keep track of and manage within even a relatively small and local computer network. Any one or more of these nodes can fail, for one reason or another, either temporarily or permanently, and certain other nodes can be added or removed by network users under certain conditions, and this complex and dynamic network node scenario must be efficiently and effectively managed if the computer network's intended purpose is to be fulfilled. Moreover, this network node management problem is compounded when the network is large, and possibly worldwide. The subject of these computer network nodes is discussed further in two patent applications filed by the assignee of the present invention: "Plug and Play Interface for User Actions", Desai et al, U.S. Ser. No. 09/916,102, filed Jul. 26, 2001 and "Scalable Communication Within a Distributed System Using Dynamic Communication Trees", Bauer et al, U.S. Ser. No. 09/877,862, filed Jun. 8, 2001, both of which are incorporated by reference herein in their respective entireties.

One prior art solution to the problem of managing network nodes is to elect one node to have complete information about all other network nodes in the system. Similarly, a group of nodes can be elected where each elected node in the group is assigned to its own subnet or domain of nodes and has complete information about all other nodes in its own subnet or domain. A subnet or domain is a network unto itself. All other nodes in that network, or in that subnet as the case may be, then seek information necessary to their functioning from their respective one elected node and are thus managed through that one elected node. The inherent weakness in this configuration is that if such one elected node fails, then no other node in its respective network or subnet can function resulting in a failed network or subnet. This is a single point of failure design which is not an optimum design because of at least this problem.

Prior art attempts to make this single point of failure design more reliable included use of backup nodes, to take over functioning of an elected node if and when the elected node failed. The problem with this backup design is that backup nodes can also fail and then the result is the same as before a failed network or subnet within the network. Furthermore, when dealing with a worldwide network, which is not atypical today, if backup nodes are being relied upon because of potential elected node failures, and if all backup nodes are being maintained in one locale (e.g. United States of America) for convenience, security, or other purposes, then virtually all network node information can be destroyed for that global network if a disaster at the backup locale destroys the backup nodes. This would be a major disruption. All worldwide users (Europeans, Asians, etc.) of that worldwide network would thus lose the service provided by that network.

Effective solutions to these single point of failure problems of the aforementioned prior art are presented in the patent application cross referenced herein, and include use of a master node which can be selected from the ranks of participating nodes in a network domain or configuration. The master node is a privileged node relative to its participating nodes and controls the directory database (DDB) distributed within each of its participating nodes to match its own DDB and thereby be substantially identical from node to node across its domain. The master node is selected or replaced with another node under control of a global administrator, a privileged network user having special password access to enable only him/her to perform these master node changes. It is prudent computer network practice to have only one global administrator per domain, or one person of authority under such global administrator per domain, who selects and changes master nodes.

This master node solution is very satisfactory in any DDB network or domain within that network in which only one master node asserts itself on participating nodes in that network or domain, which may be the usual case, particularly with LANs. However, if another user of the network gains access to the global administrator's password, either with or without proper authorization, and if that other user selects a second master node (a purported or contending master node) in the same domain that had a previously operative master node, then a conflict results. All nodes in the configuration would then be subject to assertions by two different master nodes that each of those master nodes is the true master for each node in that domain. This problem may be compounded further if there are more than only two users having this password access. This problem may be compounded even further if this is a globally-dispersed network where human language barriers can be challenging and result in multiple masters being created by mistake. Further, widely-varying time zone differences (some users are sleeping while others on opposite sides of the globe are working on the global network) might also contribute to multiple masters being created by mistake.

Thus, there is need for a solution to this multiple master conflict problem, and the present invention is an effective solution.

SUMMARY OF THE INVENTION

Embodiments of the present invention include apparatus, method, system, and/or computer program product for resolving multiple master node conflict in a computer network having a plurality of nodes only one which should be master node. The conflict is between at least a first purported master node and a second purported master node. One of these nodes is chosen to be master node.

In another aspect of the present invention a computer network has a plurality of nodes each of which has a directory database (DDB) and one of which should be master node. The master node is used to maintain contents of the DDB in each of the nodes consistent throughout the plurality in a manner to avoid a single point of failure. A DDB is a database of directory information, such as a directory of addresses of these nodes. These nodes, such as computer storage systems, interact with computer network information and can receive, store, modify and/or transmit the information. Embodiments of the present invention include apparatus, method, system and/or computer program product to resolve conflict between a first purported or contending master node and a second purported or contending master node within the plurality of nodes, by establishing a standard for comparison between the first purported master node and the second purported master node, by comparing the first purported master node against the second purported master node in accordance with the standard, and by selecting either the first or second purported master node to be the master node based on the comparison. In such apparatus there is a device that establishes the standard, another device that compares the two purported masters, and yet another device that selects one or the other purported master. The purported master node not selected is demoted to non-master status and is returned to the plurality of nodes as a participating node in that plurality.

In yet another aspect of the present invention, the standard is a temporal standard. When the first purported master node was selected master node of the network a first time of selection was obtained and when the second purported master node was selected master node of the network a second time of selection was obtained. The first time and second times of selection are compared to obtain the most recently selected purported master node. The most recently selected purported master node is allowed to be master node and the other purported node is demoted to non-master status as a participating node in the plurality. If both purported master nodes are selected simultaneously, a default condition results whereby the purported master node having the lower IP address becomes the master node. (The higher IP address could have been used instead.)

In a further feature of the present invention, in the first purported master node, the local time of selection of the first purported node as master node is recorded and the duration of the selection is measured to obtain a first selection duration.

The duration is communicated to all other nodes in the plurality. Similarly, in the second purported master node, the local time of selection of the second purported node as master node is recorded and the duration of that selection is measured to obtain a second selection duration. The second duration is also communicated to all other nodes in the plurality.

For each one of the nodes in the plurality except for the two purported master nodes (for the slave nodes), the local time of receipt of the first selection duration is noted and the first duration is subtracted from that local time of receipt to obtain first adjusted local time, the local time of receipt of the second selection duration is noted and that second duration is subtracted from that second local time of receipt to obtain second adjusted local time, and the two adjusted local times are compared to obtain the most recent adjusted local time. The node associated with the most recent adjusted local time, either the first purported master node or the second purported master node, is identified in each of the slave nodes.

Concurrently with this activity in the slave nodes, in the first purported master node the local time of arrival of the second selection duration is noted and that duration is subtracted from that local time to obtain a first purported master node adjusted competitive local time. That competitive local time is compared with the first purported master node's local time of selection as master to obtain a first most recent selection time. The node associated with this first most recent selection time, either the first purported master node or the second purported master node, is also identified.

And, concurrently with these activities in the first purported master node and slave nodes, in the second purported master node the local time of arrival of the first selection duration is noted and that duration is subtracted from that local time to obtain a second purported master node adjusted competitive local time. That competitive local time is compared with the second purported master node's local time of selection as master to obtain a second most recent selection time. And the node associated with this second most recent selection time, either the first purported master node or the second purported master node, is also identified.

The number of times that the first purported master node is identified in each of the slave and purported master nodes as the most recently selected master node is tallied to obtain a first total, and the number of times that the second purported master node is identified in each of the slave and purported master nodes as the most recently selected master node is also tallied to obtain a second total. If the first and second totals are equal the tie is broken by selecting the purported master node that has the lower IP address (again, the higher address could have been used as selection criteria). But, if the totals are different, the final master node selection is made by selecting whichever purported master node had the greater total. The purported master node with the lower total is demoted to non-master-node status and returned to the plurality of nodes as a participating node.

It is thus advantageous to employ embodiments of the present invention in any computer network, including client-server networks, whether a LAN or globally dispersed WAN, where management of a distributed directory database is implemented by way of a master-node to slave-node arrangement in which only one master node should exist. For example, it is advantageous to employ embodiments of the present invention in computer networks having a plurality of nodes or storage systems each of which contains a DDB maintained consistent by a master node selected by a global administrator from the plurality, where the maintenance is performed in a manner to avoid a single point of failure and only one master node is permitted for that network at any given time. Embodiments of the present invention ensure that only one master node shall be permitted at any given time.

It is therefore a general object of the present invention to provide an improved computer network.

It is another general object of the present invention to provide improved distributed management software.

It is a further object of the present invention to provide an improved technique for managing a directory database distributed over a plurality of nodes in a network such as a client server network, such technique allowing only one master node at a time in the plurality.

It is an even further object of the present invention to provide an improved computer data storage system.

Other objects and advantages will be understood after referring to the detailed description of the preferred embodiments and to the appended drawings wherein:

BRIEF DESCRIPTION OF THE DRAWINGS

FIG. 6 is a flowchart reflecting an algorithm executed by operation of embodiments of the present invention in performing a master to node handshake;

FIG. 6A is a flowchart reflecting an algorithm executed by operation of alternative embodiments of the present invention in performing a master to node handshake;

FIG. 8 is a representation of a typical computer terminal screenshot associated with certain embodiments of the present invention employing a GUI, the screenshot reflecting a dialog box of the type which would enable a global administrator user to control master node selection;

FIG. 9 is a representation of a typical computer terminal screenshot associated with certain embodiments of the present invention employing a GUI, the screenshot reflecting a dialog box of the type which would enable a global administrator user to control domain configuration or re-configuration;

FIG. 11 is a flowchart reflecting part of an algorithm executed by operation of embodiments of the present invention in resolving multiple master node conflict;

FIG. 12 is a flowchart reflecting a continuation of the algorithm of FIG. 11 executed by operation of embodiments of the present invention in resolving multiple master node conflict;

FIG. 13 is a flowchart reflecting a continuation of the algorithm of FIGS. 11 and 12 executed by operation of embodiments of the present invention in resolving multiple master node conflict; and, FIG. 14 is a flowchart reflecting the remainder of the algorithm of FIGS. 11-13 executed by operation of embodiments of the present invention in resolving multiple master node conflict.

DESCRIPTION OF THE PREFERRED EMBODIMENTS

Preliminarily, section headings which refer to figures to which they principally relate are used hereinbelow as an organizational aid. However, there may be discussion of subject matter reflected in a particular figure which appears in a section headed by a figure number associated principally with other subject matter. The section headings are thus not intended to be construed in a limiting manner. The terms "master node" and "master" may be used interchangeably herein and have the same meaning. And, it should be kept in mind that any network in which embodiments of the present invention are operative has an intended purpose beyond management of its nodes. For example, in a computer data storage system network, in which embodiments of the present invention are particularly useful, the main purpose of each node or storage system in such network is to enhance the overall network function of storing data, and management of its distributed DDB is only one operation involved in that overall data storage function.

FIG. 1

Client Server Network

Figure 1:
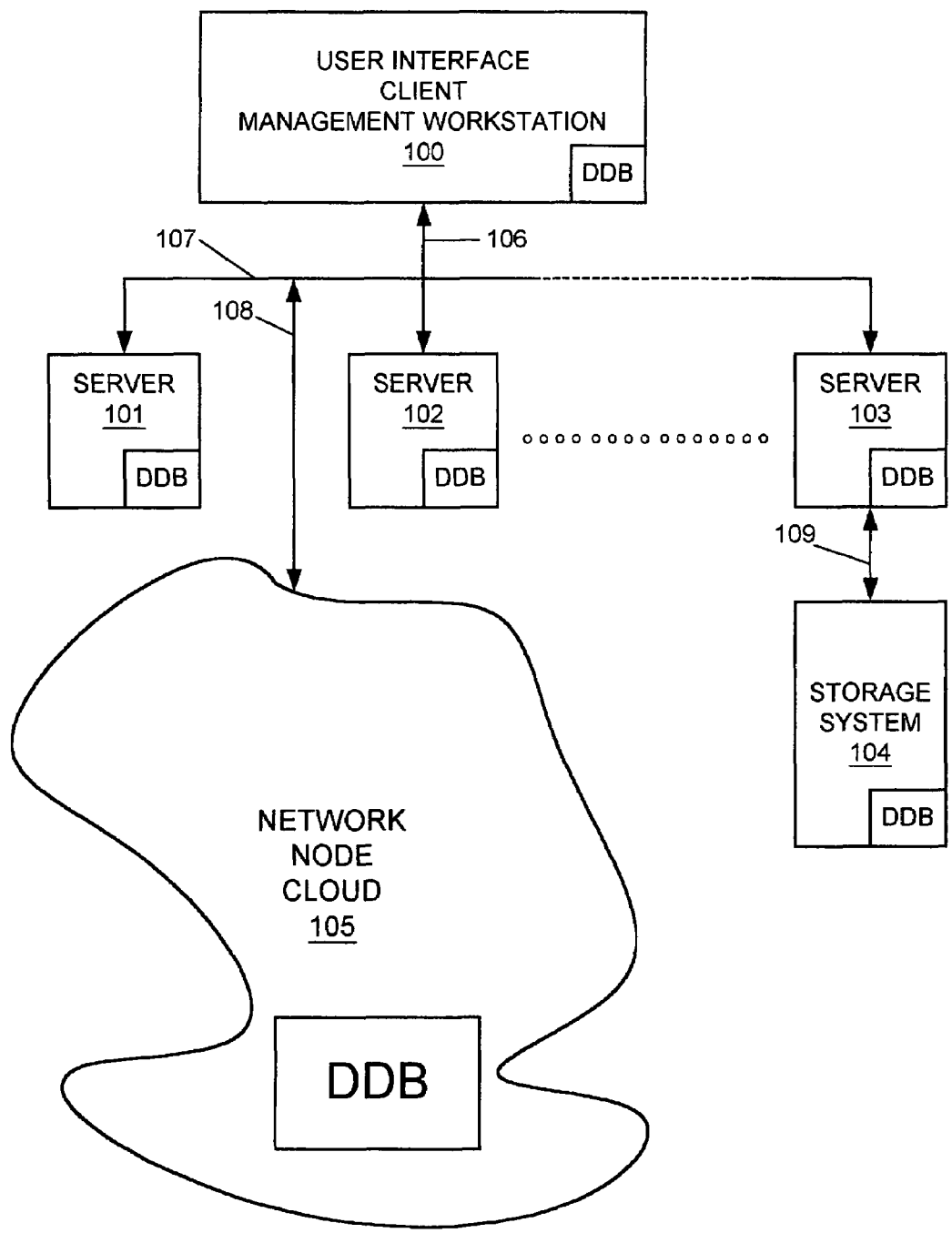
FIG. 1 is a block diagram of a client server network having multiple servers and a network node cloud in which embodiments of the present invention are particularly useful.

FIG. 1 is a block diagram of an exemplary client server network having network components such as multiple servers and a network node cloud. Embodiments of the present invention are particularly useful in this network. User interface (UI) or client or management workstation 100 is connected by bidirectional bus structures 106 and 107 to servers 101, 102, and 103. UI 100 also is operatively coupled to network node cloud 105 by bidirectional bus structures 106, 107, 108. And server 103 is operatively coupled to storage system 104 by bidirectional bus 109. The network is not limited to three servers or to one storage system, and more than three servers are intended to be suggested by the broken line representing bus 107 in connection with the dots between servers 102 and 103. In a particular configuration, UI 100 can be a Windows NT or UNIX workstation that runs Navisphere 6.X user interface software or equivalents thereof; servers 101-103 can be any Windows NT machines or EMC model FC 4700 storage systems running Navisphere 6.X management servers or equivalents thereof; and, storage system 104 can be an EMC model FC 4700 storage system or its equivalent. Network node cloud 105 is intended to represent a network such as a network of EMC FC-4700 storage systems or their equivalents, containing a huge number of nodes, possibly thousands or more As shown in FIG. 1, a directory data base (DDB) is situated in each network component shown in the network. A DDB is a database of directory information reflecting identities and addresses of both the node in which it resides and the other nodes with which it communicates, much like a telephone directory book can list names, phone numbers and addresses of all telephone subscribers to a telephone network. Since each network component may include a large number of network nodes, as discussed earlier, the DDB designation shown in each component is intended to represent DDBs distributed throughout all nodes in that component. (The DDB shown in server 101, for example, represents a plurality of DDBs.) In accordance with principles of the present invention to be discussed in more detail below, under certain circumstances the DDBs in each component are maintained consistently throughout the entire network. (The entire network could be divided into independent subnets or domains, each being a sub-network, described below.) In other words, the information content in any one particular DDB in any particular node of any particular component in the network is maintained consistent (replicated, duplicated, or made substantially identical) with content of any other DDB in the network. Using the telephone book analogy, each telephone user within that calling locale (the network) should be given the same revision or version of the telephone book (the same DDB content—the same version number). Then, all such users (nodes) have current information about all other telephone users listed in their respective books. If a telephone user moves away, (node deleted) or if a new telephone user moves into the locale (node added), then the telephone book needs to be updated with the new information. The new telephone user needs to be given a complete and current telephone book (current DDB). Under these conditions all telephone users in that locale can rely on their respective telephone directories and can properly function. Similarly, if the information content in each DDB in each node in the network is maintained consistent regardless of network node changes (node additions, node deletions, node failures, master node failures, failed links, etc.), then the computer network nodes can rely on their respective database directories (DDBs) and can properly function.

FIGS. 2 & 3

Nodes

Figure 2:
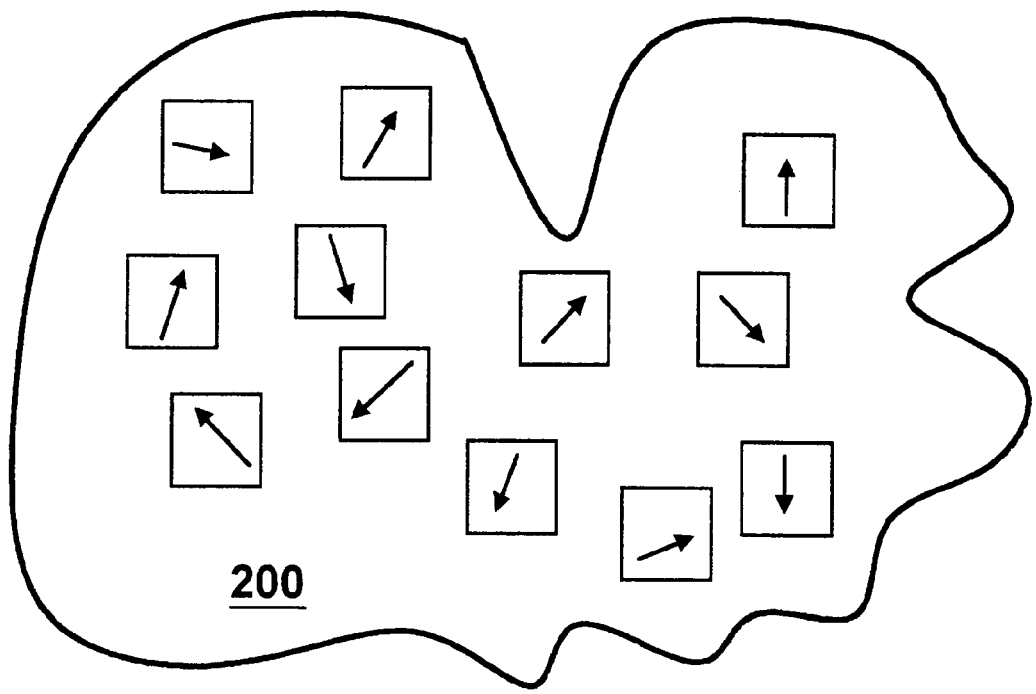
FIG. 2 is a schematic diagram showing unconfigured nodes within a defined boundary.

FIG. 2 is a schematic diagram showing unconfigured nodes within a defined boundary. Bounded space 200 may represent, for example, a portion of a computer system which has not yet been organized into an interrelated or cooperative entity, such as may exist in a recently purchased system just delivered to the purchaser and prior to such system being configured. The squares in the space represent nodes. The arrows in the squares pointing in random directions are intended to suggest that these nodes are not yet aligned with each other in a cooperative computer network effort. Each node's DDB has only its own identification information in it—its own IP address. Thus, each node in this scenario is functionally unaware of other nodes within this boundary and if it were to respond to any computer information stimuli (data and/or commands) such response would probably be independent of, uncooperative with, and/or contradictory to responses to the same stimuli received by other unaligned nodes. Bounded space 200 is not a network—yet.

Figure 3:
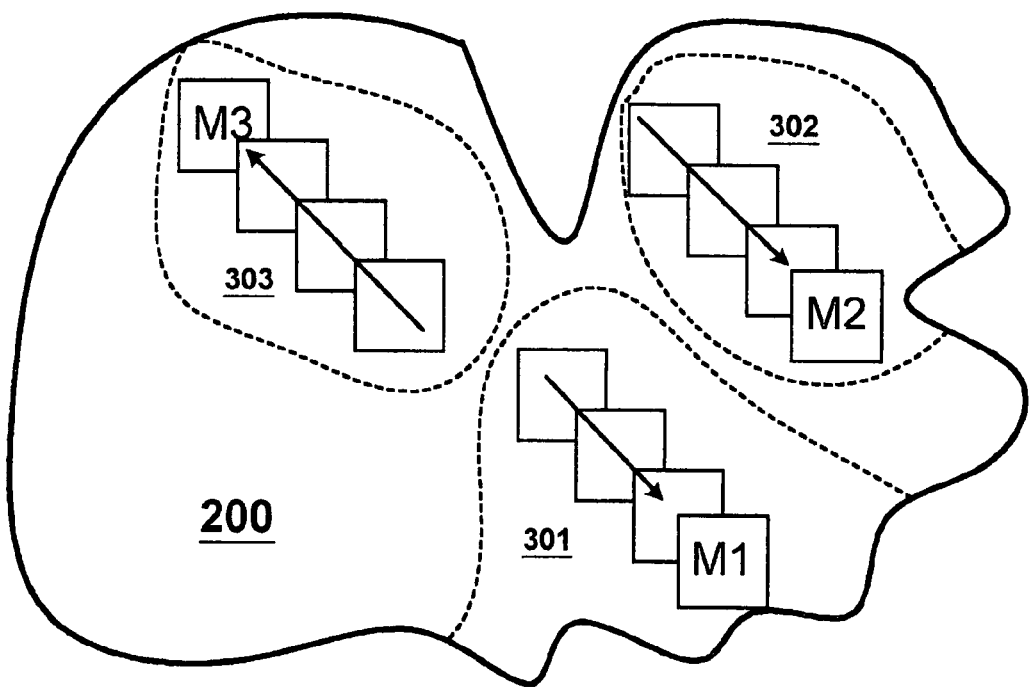
FIG. 3 is a schematic diagram showing configured nodes in three different domains within the same defined boundary.

FIG. 3 is a schematic diagram showing the same nodes as those in FIG. 2, but now shown as configured nodes in a network of three different domains, 301, 302, and 303 within the same defined boundary as that of FIG. 2. The same bounded space 200 thus contains the same nodes as before, but which have now been aligned, figuratively speaking, as shown by arrows, and segregated into domains within the same network boundary. (There is no literal, physical alignment or orientation of nodes into a particular geometrical direction FIG. 3 reflects such orientation as an aid to comprehension.) Alignment, in this context, means that a particular node is subordinate to, and takes its direction from, only its master node. In accordance with principles of the present invention to be discussed in more detail below, in domain 301 nodes are aligned to node M1, in domain 302 nodes are aligned to node M2, and in domain 303 nodes are aligned to node M3. Nodes M1, M2, and M3 are termed "master nodes". The master nodes are nodes selected from the prior field of nodes within bounded space 200 and are made a little special or privileged as compared with the nodes now in alignment to them. Aligned nodes are termed "participating nodes". The responsibility of a master node is to ensure that contents of DDBs of all participating nodes in its configuration (all nodes in domain 301 including master M1 are in the configuration of master M1, etc.) are maintained consistent or substantially identical. The master node's job is to replicate or duplicate the information content stored in its own DDB into each DDB in each participating node in its configuration. As noted, after each such DDB is replicated as desired it can be conceptualized as being "aligned" to its master node, as exemplified by the arrows superimposed on the nodes in domains 301, 302, and 303 pointing, respectively, in alignment to master nodes or masters M1, M2, and M3.

These master nodes are selected by a computer network user termed a "global administrator", a user who is privileged as compared with other users in that computer network. Only the global administrator has proper authorization to select or change master nodes, and make other network changes. Other users have rights limited to merely using the network, as is. The global administrator selects nodes M1, M2, and M3 through a network user interface, e.g. UI 100 of FIG. 1, based on factors relevant and important to the administrator. For example, selection of master nodes could be based on proximate locations of such nodes to those intended to be in their respective configurations. Another example would be selection of a master node based on its functional relevance to the intended function of its configuration. The internet protocol (IP) addresses of the nodes to be selected as master nodes are known to the global administrator by way of the GUI, about which more shall be discussed hereinbelow.

FIGS. 4A/B

Network & Domains

Overview

Figures 4A, 4B:
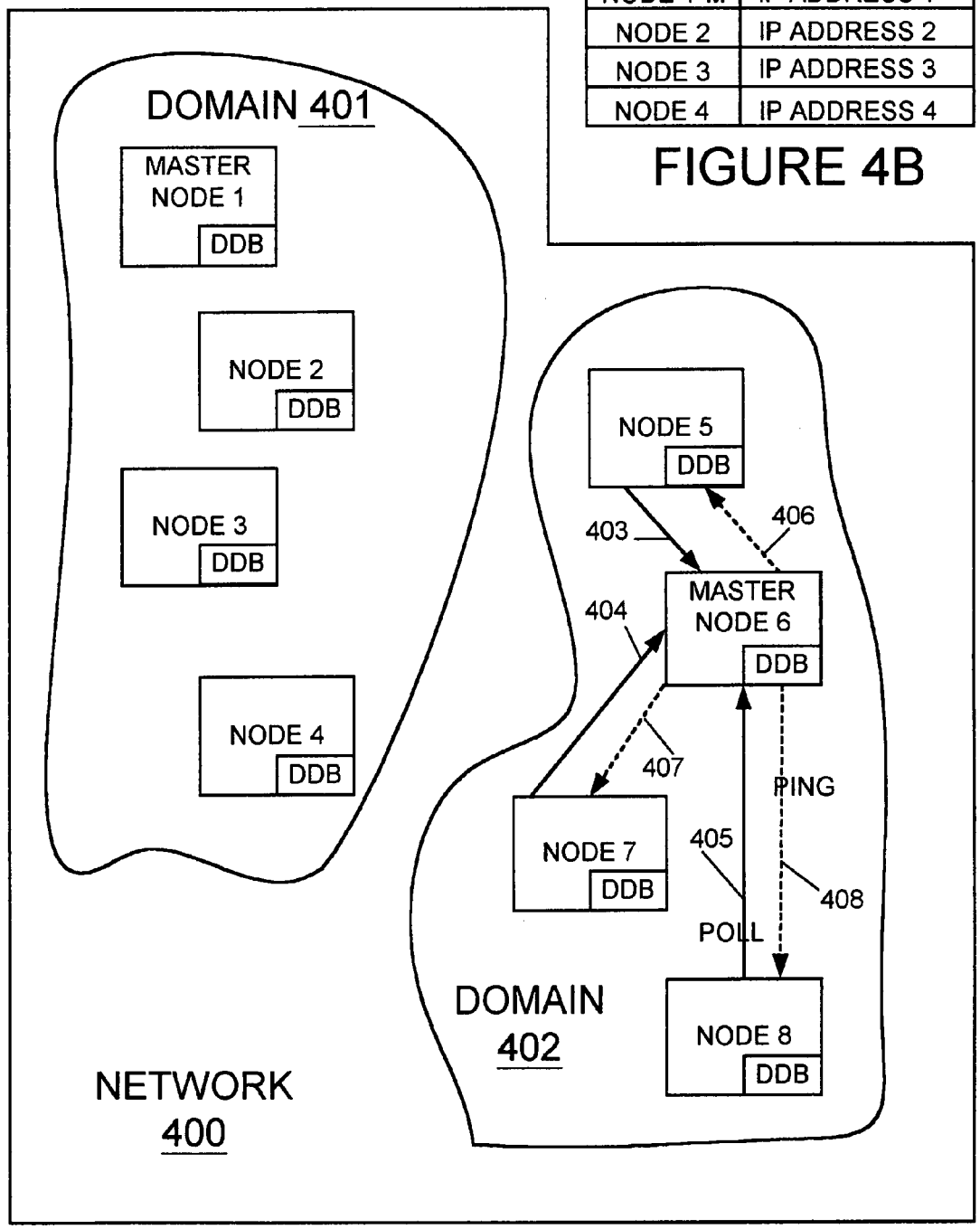
FIG. 4A is a schematic diagram of a network containing two domains of network nodes having a master node in each domain.
FIG. 4B is a schematic diagram of the directory database distributed throughout one domain in the network of FIG. 4A.

FIG. 4A is a schematic diagram of an exemplary network containing two domains of network nodes having a master node in each domain. This diagram shall be used in an overview discussion involving creation of a configuration, and shall use the example of adding nodes to the configuration as an introduction to certain concepts of the present invention. More detail about these concepts shall be presented hereinbelow in connection with other Figures.

Assume that network 400 initially was not configured as shown, but that it was merely a boundary which contained nodes 1-8 inclusive in an unconfigured state, such as reflected in FIG. 2. The first action undertaken is for the global administrator to pick a node as master, and, in this example, node 1 is picked. Node 1 is selected by way of a GUI (not shown in this Fig.) through a "select master" dialog box which appears on a terminal screen of the GUI and which reflects IP addresses of nodes in this boundary. At this point, the master node represents a configuration of one node—no other node in the otherwise unconfigured boundary is aware that node 1 has been made master node. Then, assume that the global administrator adds nodes 2 and 3 to the configuration, in that order, by sequentially selecting such nodes' respective IP addresses from a "configure domain" dialog box on the terminal screen of the GUI, by placing the terminal screen cursor and clicking the mouse on "buttons" appearing in this dialog box which cause these nodes to be sequentially added to the configuration. More about this procedure will be presented in connection with FIGS. 13 and 14 hereinbelow. At this point, however, status of all nodes is: DDBs in nodes 1, 2, and 3 each have the same contents, namely: IP addresses of nodes 1, 2, 3, and a flag that node 1 is master, and nodes 4-8 remain unconfigured for the time being. Domain 401 has thus far developed into a three-node configuration. The unconfigured nodes are further discussed hereinbelow.

Backtracking momentarily, when the global administrator is adding node 2 to the configuration, such node is necessarily being added through, or by way of, the only node that pre-existed node 2 in the domain 401 configuration, namely node 1. Accordingly, node 1, acting as master node, forwards information to just-arrived node 2 which advises node 2 that node 1 is going to be master for node 2 and that node 2 has been added to the configuration of node 1. Node 2 is thus a "master-added node". Node 2 then checks the version number of the DDB in information received from the master node. A version number is a unique worldwide number (WWN), a number that if once used is never used again. In this example of a new configuration being created out of a boundary of chaotic or unaligned nodes the version number of the master node's DDB could be zero. If the version number in information sent by the master node is different from the pre-existing version number of the DDB in node 2 (the likely case), then node 2 needs to get a copy of the entire contents of the master's current DDB and to update (replace) the DDB in node 2 to be identical to the DDB in node 1. But, if version numbers of the DDBs in nodes 1 and 2 are the same (not likely), then the foregoing update/replacement is avoided. The same basic procedure is undertaken for node 3 and for any other node to be added to the domain 401 configuration, but there is some significant variation to the procedure as a function of which node in the configuration is selected by the global administrator to be a "portal node"—the node through which a new node is to be added. If the portal node is master node, then the above procedure is used, but if the portal node is a configured node within domain 401 other than master node then a different procedure is used, as follows.

If the global administrator adds node 3 through node 2 thus making node 2 a portal node for new node 3, node 2 stores the IP address of node 3 in a cache memory within node 2 (not within the DDB of node 2), sends a message to master node 1 that node 3 has been or is being added and provides the IP address of node 3 in that message. If master node 1 successfully receives this message from node 2, master node 1 immediately updates itself by adding node 3 IP address information to its DDB and changes its version number. The version number changes from one unique WWN to a different unique WWN. Concurrently, node 1 sends a "success note" back to portal node 2 about which more will be said below. Further, master node 1 sends a message to node 3 that the master for node 3 is node 1 and also provides node 3 with the changed new version number of node 1 as well as a copy of the contents of its entire DDB. Newly arrived node 3 accepts such contents, updates its DDB therewith, applies the changed new version number to such contents, and is thereafter a participating node along with node 2 in a configuration designated as domain 401 in which node 1 is master node.

Although, node 2 has retained the IP address of newly-added node 3 in its cache memory, node 2 has not yet been updated. The earlier-mentioned success note contains at least the master node's prior version number as well as its changed new version number. Node 2 compares the master node's prior version number received in the success note against its own version number of its DDB. On the one hand, if these version numbers match, portal node 2 updates its own DDB with node 3 IP address information which is being stored in the node 2 cache memory, thereby relieving the master node from unnecessarily returning node 3 IP address information back to node 2. Portal node 2 also updates its version number to be the same as the changed new version number of the master node which was received in the success note. But, on the other hand, if the prior version number of master node 1 did not match the version number of portal node 2, then portal node 2 destroys contents in its cache memory about new node 3 and waits for its update message from master node 1. (The update message is a change notification to all participating nodes in the master node's domain and is part of the master node's replication process.) If there were many other operative and participating nodes in domain 401, they would all be subjected to this replication process and portal node 2 would be just one of all such participating nodes being updated with information about newly added node 3 at the time of the update message. A significant aspect of this procedure is that portal node 2 receives minimal communication from master node 1 to achieve update of its DDB as noted above. Accordingly, any master node is worked minimally and network or configuration "housekeeping" traffic is kept minimal in the present invention while maintaining contents of distributed DDBs consistent throughout any given node configuration.

Next, consider node 4, another new node being added to the configuration of domain 401. If the global administrator, by way of the computer network's GUI, selects node 3 as portal node for node 4, and if node 3 cannot properly communicate with master node 1 for one of a number of reasons such as the network link between master and node 3 (not shown in FIG. 4A) has failed, then node 4 cannot be added to the configuration through node 3. In such an event, an error message is sent to the GUI so that the global administrator knows to select another node as portal node for node 4. The global administrator can again select node 2 as portal node, this time for node 4, and node 4 can thereby be successfully added to the domain 401 configuration in a manner similar to the adding of node 3. (Another reason why node 4 might not be able to be added to the configuration is that the master node itself has failed in which case an error message is again returned to the global administrator as before, but which additionally advises of failure of a master node. In this case the configuration is frozen and cannot be changed until a new master is created by the global administrator, and discussion of this event is presented hereinbelow.)

Domain 402 is shown with nodes 5, 6, 7 and 8. These nodes are shown in a configuration with node 6 as its master node. These four nodes in this configuration have been created in the same manner as those in domain 401, but either by a different global administrator from the one in control of domain 401, or by the same global administrator intending to establish a different and mutually-isolated domain from domain 401. Accordingly, these two domains represent two different configurations which can co-exist in a single computer network without either domain interfering with the other. More than two domains can co-exist in a single network and only two are shown as an example. (Related subjects are further discussed hereinbelow in connection with the section on "Marriage of Two Subnets"). Nodes in this domain are shown to be interconnected by communication lines 403-408 in a particular manner. More is said in the incorporated-by-reference related application about these communication lines and about master node "pinging" and participating node "polling" techniques utilized in certain failure scenarios.

In FIG. 4B, the DDB which is distributed throughout the configuration of domain 401 is depicted in schematic format. Content of this DDB reflects successful addition of node 4 to the domain 401 configuration and is the same content for each DDB within each of nodes 1-4. This DDB associates each of the nodes in the configuration with its respective IP address. These nodes could thus be localized, as in a LAN, or could be far-flung and located around the globe being connected through the Internet. Node 1 has a flag associated with it, shown in the diagram as an "M" to designate node 1 as the configuration's master. Since each node in the domain 401 configuration has these contents in its DDB, each node knows that node 1 is its master, because each DDB contains this "M" flag next to or associated with the node 1 address content in its database. And each node in the configuration also knows the IP address of every other node (all other nodes) in the configuration. The DDB contains domain identification information, as reflected by "DOMAIN 401" shown in the Figure. And, the DDB also contains a version number as shown, "DDB VERSION #_____", to reflect or identify the status or version of its content, namely, participating node information as currently stored in its DDB. In the case of master node 1, as noted above, it has the capacity to forward to participating nodes in its configuration not only its prior DDB version number which was stored in its DDB, but also can forward its changed update version number as stored in its updated DDB, in the event of a network configuration status change. A schematic drawing for the DDB distributed throughout the configuration of domain 402 would be similar to the DDB for domain 401, but would have different content reflecting different IP addresses and version number.

The procedure of adding a new node to a configuration, whether a master or non-master node in the configuration is used as portal node, requires certain handshaking protocols. These protocols shall be discussed in detail hereinbelow in connection with flowcharts depicting their respective algorithms. This discussion of FIG. 4 has considered the example of adding a new node in connection with a high level overview of certain aspects of the present invention. Other changes to a configuration including node deletion, node failure, master node failure, and master to node link failure are possible and are considered in detail in the related application, incorporated-by-reference herein.

FIG. 5

Establishing Configuration

Figure 5:
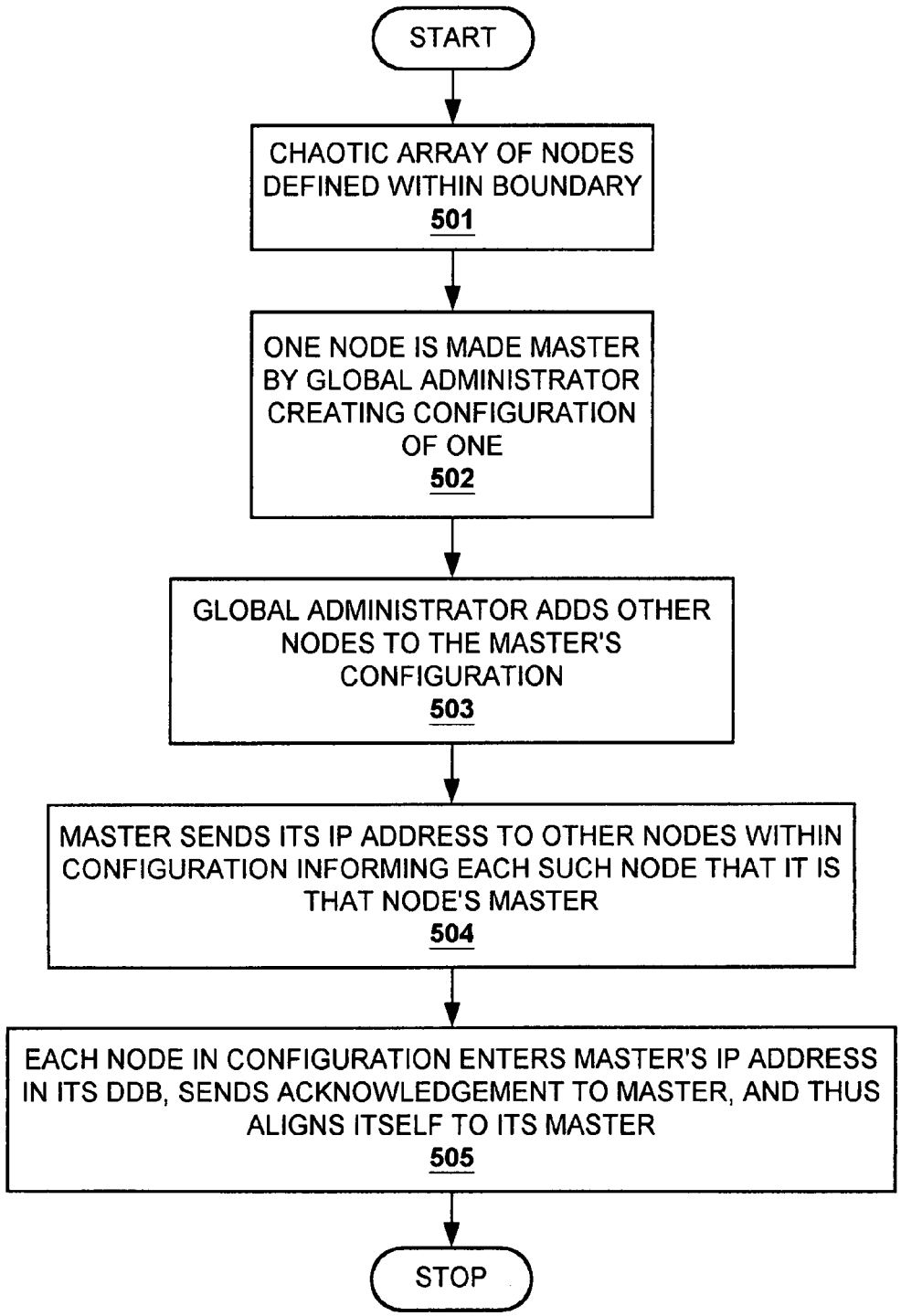
FIG. 5 is a flowchart reflecting an algorithm executed by operation of embodiments of the present invention in establishing a configuration.

FIG. 5 is a flowchart reflecting an algorithm executed by operation of embodiments of the present invention in establishing a configuration or domain. Initially, in block 501 a chaotic array of nodes are defined within a boundary, such as those nodes shown in FIG. 2. The algorithmic process moves to block 502 wherein a node is made master node by the global administrator through operation of the create master dialog box in the GUI, thereby creating a configuration of one node. In this case, one of the nodes within the boundary can be selected to be the master node. (A node outside of the boundary could have been chosen by the global administrator to be the master node.) Software, employed in preferred embodiments of the present invention, by which the master is chosen and by which all other objectives of the present invention are accomplished, is C++ object oriented software. Such software is the best mode now known by which to implement the present invention, although other object oriented software such as Java could have been chosen.

The algorithmic process then moves to block 503 where the global administrator chooses other nodes through the GUI from either within or outside of the boundary to be added to the configuration. Next, in block 504, the master node sends its IP address to all the other nodes chosen to be within the configuration informing each of them that the master node is their master. (Employing personification, in such "informing" or "announcing" the master is effectively saying: "I am the master for you".) This informing is the aforementioned pinging and is also used in connection with certain failure scenarios discussed in the incorporated-by-reference application. In block 505 each chosen node enters the master node's IP address in its DDB, acknowledges the master node, and thus aligns itself to the master node. This acknowledgment is vital for the master to receive from each node in its configuration so that the master knows that each such node is properly aligned. Failure to receive an acknowledgment from a particular node alerts the master that such node might have failed and sets up a repetitive pinging activity. The actions in blocks 503, 504, and 505 are accomplished by way of the configure domain dialog box in the GUI. The steps or actions in this Figure are repeated as many times as are necessary to accomplish the total number of domains desired per network. Thus, in FIG. 3, within network boundary 200, three subnets or domains are formed by these steps being undertaken three times by either one or multiple global administrators.

FIGS. 6 and 6A

Master to Node Handshake

FIG. 6 is a flowchart depicting an algorithm executed by operation of embodiments of the present invention in performing a master to node handshake. For situations wherein a master node has need to send substantive information to its participating nodes, this handshake is used with each such participating node prior to the master sending that information to that participating node.

In query block 601, for each node in the configuration, a decision or determination is made regarding whether or not the master node's IP address in the configuration update (for either a node added or node removed update) matches the purported master node's IP address stored in each node's DDB, as verification of the master's identity. Verification is important because participating nodes in a configuration must receive commands and updates from only their one true master node. Without verification a problem could arise. For example, if a master node fails, requiring the global administrator to select a different node as new master node, the new master node sends out notification to all nodes in its configuration that it is their new master node. All participating nodes in the configuration realign themselves to the new master node without problem. But, if the failed master node recovers after selection of the new master node, and if a user or different global administrator erroneously logs-in to that previously failed master, there is a chance that it might be erroneously used as master in the same configuration, which has to be prevented. The verification operation defined by query block 601 prevents this problem from occurring In block 601, if there is an IP address mismatch whereby the answer is "no" for any particular participating node in the configuration, then in block 605 the change or configuration update is not recognized by that particular node, the event is not logged into the DDB of that particular node, and the handshake is concluded. In effect, this means that the particular node sends a message back to the master node advising it that it is not the particular node's master (in such case the likelihood is that the particular node is participating in a different domain under a different master). Thereupon, the master node removes the IP address of that particular node from the master node's DDB and sends the change to all other nodes in the configuration. However, if the answer is "yes", the process then moves to query block 602 where version numbers are compared. For each participating node in the configuration, its DDB version number before the configuration update is compared with the master node's DDB version number before the update. This step ensures that each participating node's DDB contents were the same as the master node's DDB contents before the update.

On the one hand, if the version numbers are the same whereby the answer to the query in block 602 is "yes" then in block 604 only the update information (only the IP address of the node being added or the node being removed) is accepted into that participating node's DDB, and the handshake concludes. On the other hand, if the answer is "no" then the version numbers do not match which means that contents of their respective DDBs do not match. There is no readily available technique to determine to what extent any such DDB may be out-of-date. Accordingly, for the situation of a version number mismatch, in block 603 the participating node flushes its contents and accepts the entire contents of the master node's DDB including both updated configuration information about the added or removed node and a changed new master node version number. Thereafter, the handshake concludes.

Referring next to FIG. 6A, a flowchart is depicted of an algorithm executed by alternative embodiments of the present invention in performing a master to node handshake. The flowchart is the same as that in FIG. 6 except for the addition of two blocks, 606 and 607. If there is a mismatch between a master node's IP address as reflected in an update message from that master node and second purported master node's IP address as stored in the DDB of any participating node in the configuration, then the algorithmic process moves to query block 606. In query block 606 a determination is made regarding whether or not the other master node's IP address stored in that participating node's DDB is null (invalid). On the one hand, if "no", not null (meaning valid), then such address is in conflict with the master node IP address in the update message, whereby the update/change is not recognized or accepted as reflected in block 605, and the handshake is concluded. On the other hand, if "yes", meaning that such address is null, then that nulled or invalidated address had earlier been made ineffective and cannot possibly be in conflict with the master node IP address in the update message. But the nulled address does indicate that such participating node's DDB contents may be out-of-date. Accordingly, in block 607 such participating node flushes the contents of its DDB, and updates its DDB with the new master name and a copy of all contents stored in the master node's DDB, including both the update message and master node DDB version number. Thereafter the handshake concludes.

FIG. 7

Node to Master Handshake

Figure 7:
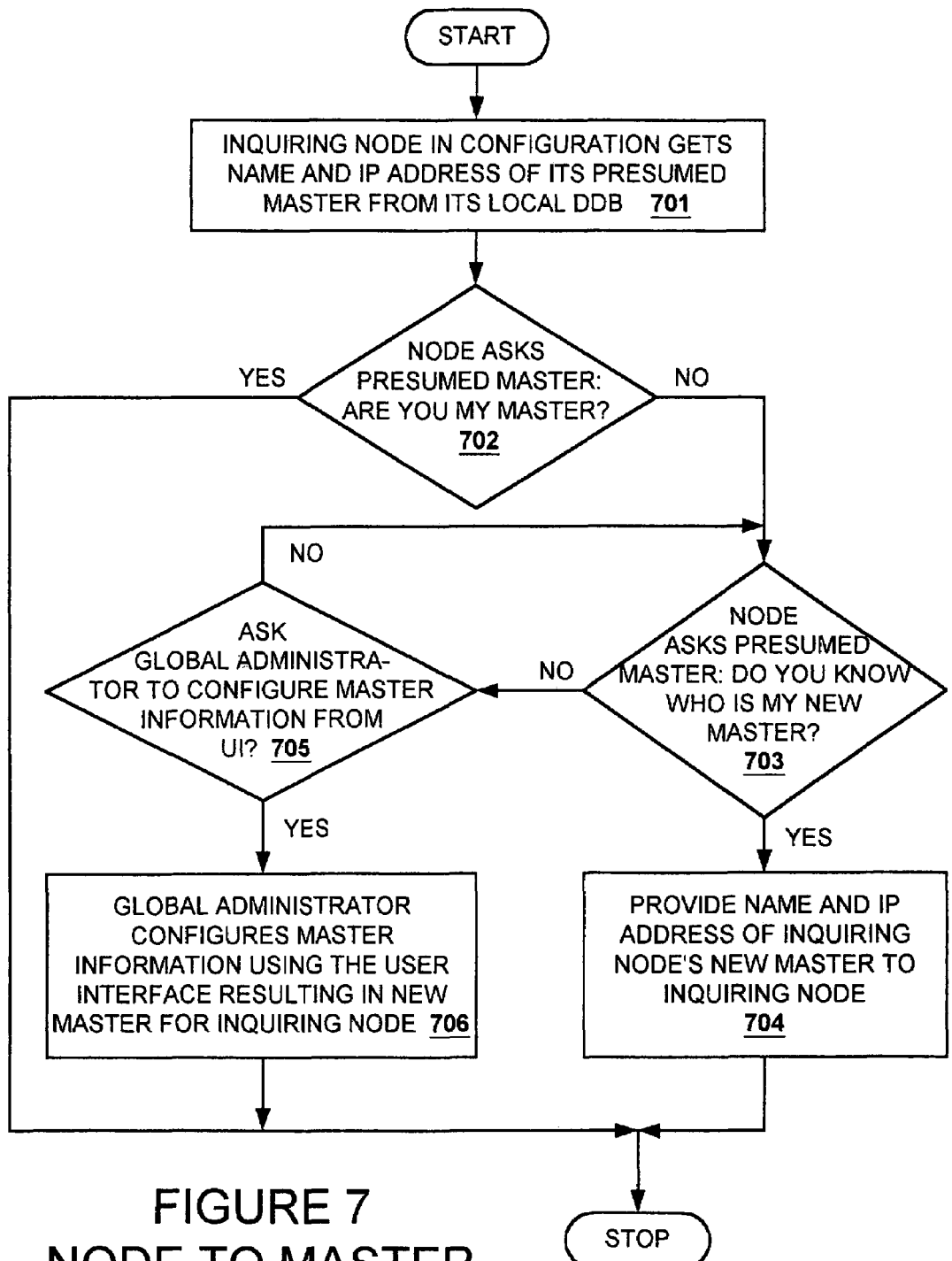
FIG. 7 is a flowchart reflecting an algorithm executed by operation of embodiments of the present invention in performing a node to master handshake.

FIG. 7 is a flowchart depicting an algorithm executed by operation of embodiments of the present invention in performing a node to master handshake. For situations wherein participating nodes in a configuration have need to send substantive information to their master node, this handshake is used for each such node prior to its sending that information.

In block 701, an inquiring node having need to send substantive information to its master gets the name and address of its presumed master stored in its own, local, DDB. In decision block 702 that node inquires of the presumed master if it is that node's master. If the presumed master node responds "yes", the handshake is concluded. But, if the presumed master node responds "no", then the algorithmic process moves to another decision block, block 703.

In block 703 the inquiring node inquires if the presumed master knows who is the new master. If the answer is "yes", where the presumed master knows the identity of the new master, the algorithmic process moves to block 704 wherein the presumed master provides the name and IP address of the new master to the inquiring node after which the handshake is concluded. But, if the answer is "no" the algorithmic process moves to yet another decision block, block 705.

In block 705, which is needed when the presumed master does not know who is the new master, a decision needs to be made about asking the global administrator to configure a new master node by use of the select master dialog box in the GUI (discussed in connection with FIG. 8). If the answer to the query in block 705 is "no", the inquiring node inquires again in block 703 if the presumed master knows who is the new master it is possible that the presumed master may have learned of the new master's identity. For example, the presumed master may have been a master that failed and was earlier replaced with a new master by the global administrator. If the presumed (failed) master was not brought up-to-date by the time of occurrence of the first inquiry by the inquiring node, but is brought up-to-date at a later time whereby identity of the new master is then made known to the presumed master, then inquiry of the presumed master (in block 703) after that later time will result in provision of the new master's identity. This iterative loop or iteration means thus operates until either block 704 is utilized as described above, or until the decision in block 705 is "yes"—to ask the global administrator to configure a new master node by way of the GUI. If "yes", the algorithmic process moves to block 706 wherein the global administrator configures new master node information using the GUI which results in a new master for the inquiring node and the handshake is concluded.

FIG. 8

Select Master Dialog Box

FIG. 8 is a representation of a typical computer terminal screenshot associated with operation of certain embodiments of the present invention employing a graphical user interface (GUI) with a computer network including storage systems. A GUI could be employed within client or management workstation or user interface 100 in FIG. 1. The screenshot depicts a dialog box of the type which would enable a global administrator (privileged user) to control master node selection.

With regard to screen layout, in the upper left hand corner of the Figure, a "Select Master" title in the toolbar is shown and in the upper right hand corner in that toolbar an exit button "X" is shown and used to exit the dialog box. Under the heading "Master Node IP Address" there is shown an editable field containing, in this example, a specific IP address: 128.221.34.187. The global administrator can select or change master nodes by editing this field, described below. There is a "Master Candidate Nodes" section in the screenshot. This section displays nodes which are participating, configured nodes in the domain and are thus available as candidates from which one can be selected or elected by the global administrator as master. In this section, three categories of information are provided: "Node Information", "System Name" and Provider Information".

Node Information includes IP address and system identifier of a particular node or system. As noted earlier, an entire storage system can be treated in object-oriented software as an object or node and thus can have an IP address (or possibly more than one address) associated with it. The system identifier is constructed from the last two segments of the IP address of that system (e.g. 128.221.34.187 is the IP address corresponding to system identifier CPC34187).

System Name is the name assigned to the system or node and is just a label or tag.

Provider Information includes name and version number of providers installed in the system. A provider is a functional software module. This version number is not the same as version number of the master node and its participating nodes earlier discussed, but is version number of the provider software.

There are three entries shown in the Master Candidate Nodes section, having system names "Array 3", "Array 2" and "Array 1", with associated Node Information and Provider Information. In the lower right corner of the Figure are four control buttons: "OK", "Apply", "Cancel", and "Help".

With regard to operation, the global administrator can point the cursor and mouse-click on Apply (can hit Apply button) to make a node selected from this group of three nodes appear in the editable field above and become new master for this configuration. In this example, the second candidate in the Master Candidate Nodes section corresponding to Array 2 is selected as master node, as is reflected in the editable field. The OK button performs the same action as the Apply button, but also closes the dialog box. The Cancel button closes the dialog box without saving the global administrator's changes thereby maintaining the status quo. And, the "Help" button launches a help menu for this Select Master dialog box.

However, before any of this operation can be performed, the global administrator first has to bring up the dialog box. And, before the dialog box can be brought up, the global administrator first has to bring up a web browser on his/her terminal screen and type into the Uniform Resource Locator (URL) slot the IP address of a storage system chosen by the global administrator (in this example, one of the IP addresses for Array 1, 2, or 3). Such storage system may be part of a small or large domain or network of storage systems and possibly other nodes. In this example the global administrator could have typed-in the IP address of any of the three arrays shown and the same substantive information would have been displayed because the DDB in each of the three storage systems contains the same directory data. However, the information may be displayed in a different order as a function of which IP address was typed in. By accessing a system or node in this manner, a framework software is brought into operation, which provides the framework or foundation of the terminal screen display. With reference to one of the incorporated-by-reference patent applications, "Plug and Play Interface for User Actions", Desai et al, U.S. Ser. No. 09/916,102, filed Jul. 26, 2001, a dialog box of this kind can be created by a software module that plugs into such framework software as described in that patent application. However, after framework software comes up, a security operation involving password access is next undertaken to ensure that only a user with proper password (presumably global administrator) has access to the Select Master dialog box. If the proper password is supplied, the framework software thereafter offers a menu item "Select Master". And, if that menu item is pointed-to and clicked-on by the global administrator, or other authorized user, then, this dialog box is finally launched.

The act of launching this dialog box causes reading of directory information from the DDB in the storage system node chosen by the global administrator. In this example, that DDB contains node, system name, and provider information of Array 3, Array 2 and Array 1 respectively, and displays it as shown. This information shows that this DDB has three storage arrays—three IP addresses in this case—and that the chosen storage system is thus participating in a domain or configuration that has three nodes. In the case where a storage array has two IP addresses associated with it, the same system name will appear on the screen twice, reflecting both IP addresses on two separate rows.

Any one of these three nodes (if all are operative) can be selected by the global administrator to be master node by merely highlighting that selection in the Master Node Candidates section and hitting the OK or Apply button. This action will move the IP address corresponding to that selection to the Master Node IP Address editable field and replace the IP address of any node that might have been in that field. That replaced master node is then demoted to being a participating node of the configuration. (Referring back to FIG. 4B, the "M" identifier is moved from Node 1 to either Nodes 2, 3, or 4 in that domain.) If one of the listed nodes had failed, for example Array 1, and is thereafter selected to be master node, then after highlighting Array 1 and hitting the Apply button the user interface returns an error signal indicating that CPC 3463 was not able to be contacted. Another node will then have to be selected. As noted, in this example, the global administrator selected array 2 and its IP address appears in the editable field at the upper portion of the screenshot. After the global administrator is finished with his/her master node selection, the dialog box can be closed out by hitting the X in the upper right corner.

FIG. 9

Configure Domain Dialog Box

FIG. 9 is a representation of a typical computer terminal screenshot associated with operation of the same embodiments of the present invention that produced the dialog of FIG. 8. FIG. 9 depicts a dialog box of the type which would enable a global administrator user to configure or reconfigure a domain. In the main toolbar section, "Configure Domain" is shown as the title of the dialog box. Also, in the main toolbar, right hand side, an exit button "X" is shown and is used to exit the dialog box by clicking on it.

With regard to screen layout, there are three sections displayed: "Domain Name" near the top, "Scan Subnets" below that, and "Select Systems" at the bottom half of the screenshot.

In Domain Name section its editable field shows name of domain of the system selected by the global administrator. The term "DefaultDomain" is shown in the field, and a default domain is automatically selected if not overridden by a different selection made by the global administrator. There is a "Change" button located to the right of this field.

In Scan Subnets section there are two fields, "Subnets To Add" which is an edit control and "Subnets To Scan" which is a list control. There are also four buttons shown: "A", "Scan", "Stop Scan" and "Clear". And there is a scan progress bar.

In Select Systems section there is an editable field entitled "IP Address of System" operated upon by a "B" button to its right; an "Available Systems" field operated upon by "C" and "D" buttons to its right, and a "Selected Systems" field operated upon by three "B", "C", and "D" buttons to its left. In addition, there is a "Clear" button at bottom of this section, as well as scroll bars shown at bottom of both Available Systems and Selected Systems fields.

At bottom of the screenshot are four buttons: "OK", "Apply" "Cancel" and "Help".

With regard to operation, this dialog is brought up in the same manner as described earlier in connection with the dialog of FIG. 8. In this case, there is a "Configure Domain" menu item presented which the Global Administrator clicks on and which launches this dialog box. When this dialog is launched, the name of the system or node pointed to by way of inserting its IP address into the URL slot appears in the Domain Name field in this dialog. If the global administrator wants to change this name he/she hits the Change button which brings up another dialog (not shown) with an editable field allowing the typing-in of a different name. The domain name is visible from all participating systems in that domain which means that this same name would appear in the Domain Name field regardless of which participating system's IP address was put into the URL slot by the global administrator. Two domains can be given the same name without malfunction, (they could all have the default domain name) but this could lead to confusion. In any event, any domain name must be in alphanumeric form only, and non-alphanumeric symbols are not permitted.

In the Subnets to Add edit control the global administrator types in the address of a subnet which he/she wishes to have scanned to discover any available systems (systems unaligned to any master node) that are also compatible with other nodes in the domain which the global administrator is in the process of configuring or re-configuring. For example, nodes or storage systems or servers which fall into the category of Common Information Model Object Manager (CI-MOM) systems or servers are mutually compatible. Note that this address is not a full four-segment IP address, but is a subnet address or identifier (ID) having only three segments. The "A" button located to the right of the Subnets To Add edit control is used to for moving contents of that edit control to the Subnets to Scan list control located to the right of the button, thereby populating that list control field which is initially empty when the dialog is brought up. A populated list control field thus reflects certain subnets which the global administrator wishes to scan. As can be seen, in this example subnet address "10.14.12" is the last subnet that was added to the Subnets to Scan field, as it is located at bottom of three subnet addresses shown in that field. The global administrator uses the screen cursor to highlight one or more subnets listed and hits the Scan button to the right of the list control to start a discovery operation on those highlighted subnets. The discovery operation will cause a display in the progress bar to show percentage of completion of scan operation. The Scan button is disabled from time that scanning is started until it is finished. The Clear button is used for clearing contents of list control, this button being enabled only if the global administrator selects (highlights) a subnet listed in the list control. The Clear button is disabled and a subnet cannot be highlighted in the list control field when scan operation is in progress. The Stop Scan button is used to stop scan operation which was started by hitting the Scan button, and will be enabled only if there is a scan in progress.

After a scanning operation has completed, where progress bar shows 100%, IP addresses of any discovered nodes that are unaligned to second purported master node and which are compatible with nodes in the domain under configuration are automatically sent to the Available Systems field in the Select Systems section of the dialog. In other words, these particular discovered nodes populate the Available Systems field which has sub headings of "System" (storage system name) and "Node Info" (storage system IP address). In the example shown, in the Subnets To Scan field, the subnet having address 128.221.34 contained an unaligned and compatible node with IP address 128.221.34.80 with system name Cadsys, and this is the first entry in the Available Systems window. Likewise, the subnet having address 128.221.42 contained three unaligned and compatible nodes: 128.221.42.64; 128.221.42.80; and, 128.221.42.122 which are three entries under Node Info in the Available Systems field. Finally, the last subnet scanned having address 10.14.12 contained an unaligned and compatible node with IP address of 10.14.12.105 which is the last entry shown in the Available Systems field.

The global administrator now has a choice of selecting any or all of these available systems for addition to the domain being configured. For example, to add the node named Cadsys the global administrator would highlight this entry in the Available Systems field and hit the C button. This action would move that Cadsys entry from the Available Systems field which would thus be decreased by one entry, to the Selected Systems field to the right of the button which would thus be increased by one entry. Then the global administrator hits the Apply or OK button to cause the master node to replicate the node added change in the DDBs of all nodes in the domain and thereby keep the DDBs consistent throughout the domain.

In the Selected Systems field there are shown three nodes having the same IP addresses that were shown in FIG. 8. These addresses appear in this field when this Configure Domain dialog is brought up, which means that the domain under configuration in FIG. 9 is the same domain for which the global administrator selected Array 2 having IP address 128.221.34.187 as master node in FIG. 8. In other words, in this illustrative example, the three nodes appearing in the Selected Systems field had been earlier selected for this domain and can thus be considered as "pre-selected" since they existed in the field prior to bringing up the dialog shown in FIG. 9. In accordance with our example, this entry of three nodes in the Selected Systems field can be increased by the addition of the Cadsys system and any others selected by the global administrator.

In the reverse operation, the population of the Selected Systems field can be reduced by the global administrator highlighting an entry in the Selected Systems field and hitting button "D" which moves that highlighted entry into the Available Systems field. Then the global administrator hits the Apply button which causes the DDB in the removed node to destruct (to discard its contents), thereby unaligning its DDB from alignment to master node cpc34187. This unalignment makes the removed node available for use by other global administrators. Hitting the Apply button also causes the master node to replicate this node removal change in all the remaining DDBs in the other nodes of this domain and thereby keep the DDBs consistent throughout the domain. The "Clear" button is used to clear or empty contents of the Available Systems field to make it open for repopulation by newly-discovered available systems derived from the scanning operation in the Scan Subnets section of the dialog. The cleared systems which are thus removed from view from the Available Systems field are otherwise unaffected and their DDBs remain intact. Scroll bars at bottom of both the Available Systems field to and the Selected Systems field, also operable through left and right pointing arrow buttons at lower left and right corners of the fields, permit vertical scrolling of entries in both fields.

In the editable "IP Address of System" field located above the Available Systems field the IP address 128.221.34.16 is shown. This is an IP address of a node about which the global administrator has prior knowledge, and knows is both unaligned to any other master and compatible with nodes of this domain under configuration. The global administrator has thus typed-in this IP address into this editable field. By clicking on the "B" button, this IP address is moved into the selected Systems field and the OK or Apply button is then hit to add the node with this IP address to the configuration as described above. If the global administrator later wants to remove it, highlighting it and hitting the D button moves it over to the Available Systems field, in accordance with operation discussed above.

It should be understood that embodiments of the present invention relating to the GUI discussion of FIGS. 8 and 9 utilize JAVA® object oriented software, including the framework software discussed above and further discussed in the incorporated-by-reference patent application cited in discussion of FIG. 8. Software of the present invention operates on, through, and/or with a client workstation such as a Windows NT or UNIX® workstation to accomplish various GUI functions and operations, including those discussed in connection with both FIGS. 8 and 9.

FIGS. 4A and 6

Marriage of Two Subnets

With the GUI operational description of FIGS. 8 and 9 in mind, and referring back to FIG. 4A and FIG. 6, consider the marriage of two subnets. In FIG. 4A, where two domains or subnets are shown operating independently, each subnet is shown to have its own master. The DDB of each master node contains an IP address for each node in its own subnet. These two subnets can be physically linked or joined together (married) by the global administrator operating through the GUI, so that any node from either domain can communicate with any node from the other domain. In this married state, although communicatively linked, the nodes from each subnet behave in a manner consistent with their prior independent subnet status. There is no master to master conflict in this situation because each master is not asserting itself (not saying: "I am the master for you") upon nodes from the other subnet.

Using FIG. 4A as an example, in a subnet marriage, the two masters (nodes 1 and 6) remain within their respective domains, and the domain boundaries around domains 401 and 402 remain intact. However, there will be an operative coupling, a communication link or bus (not shown), that connects nodes 1-4 inclusive from domain 401 to nodes 5-8 inclusive from domain 402. For example, node 3 could talk to node 8, etc. Accordingly, if an IP address from one of the nodes from one of the subnets, for example node 2 from domain 1, is inserted into a web browser's URL slot on the GUI terminal screen, and a scan operation of this marriage of two subnets is performed, then nodes from both subnets will be discovered. (This instant scan is similar to, but different from, that shown in FIG. 8. The scan of FIG. 8 was for the purpose of discovering available nodes outside of a domain with which to configure or re-configure that domain, but this instant scan is to discover nodes currently existing within a domain and is performed through another dialog, not shown).

The result of this instant scan will cause node 2 to initiate an update to its master node 1, advising it of new nodes in the domain. Master node 1 will update its DDB with all node information from all nodes in both subnets. But, when master node 1 propagates its update to all nodes from both subnets, those nodes which comprise domain 402 reject the update. Those nodes have their own master node, master node 6. Because of the master to node handshake, nodes 5, 6, 7, and 8 will reject this update request since the IP address of master node 6 differs from the IP address of master node 1 (see FIG. 6, block 605). The global administrator will be able to see this at the GUI by looking at an eventlog. Master node 1 will mark nodes 5, 6, 7, and 8 in its DDB as remote nodes within its subnet. Likewise, master node 6 will mark in its DDB nodes 1, 2, 3, and 4 as remote nodes within its subnet. Thereafter, until further intervention by the global administrator, both sets of nodes co-exist in a marriage of subnets while retaining their individual autonomy.

This network configuration has practical utility when a link between domains is useful or economically feasible, but not on a continuous basis. For one example, consider the case where a startup company on a tight budget has two offices located on opposite coasts of the United States, and where they have need to access each others files. This business arrangement might arise when a West coast project is started at a different time from the East coast project and where it is useful to keep the two projects segregated except for intracompany access to each other's files. This company may lease network lines that are charged at an hourly rate to connect these two subnets cross country. And, with this marriage scheme, they can be disconnected each evening and reconnected each morning to effect a substantial savings in leased line costs. While these subnets are connected, co-workers at opposite ends of the country can read each others files at great convenience to the company, but they cannot otherwise impact each other's files, keeping the two projects segregated. The DDBs in the East coast's nodes are isolated from the West coast's master node and vice versa.

FIG. 10

Master to Master Conflict

Figure 10:
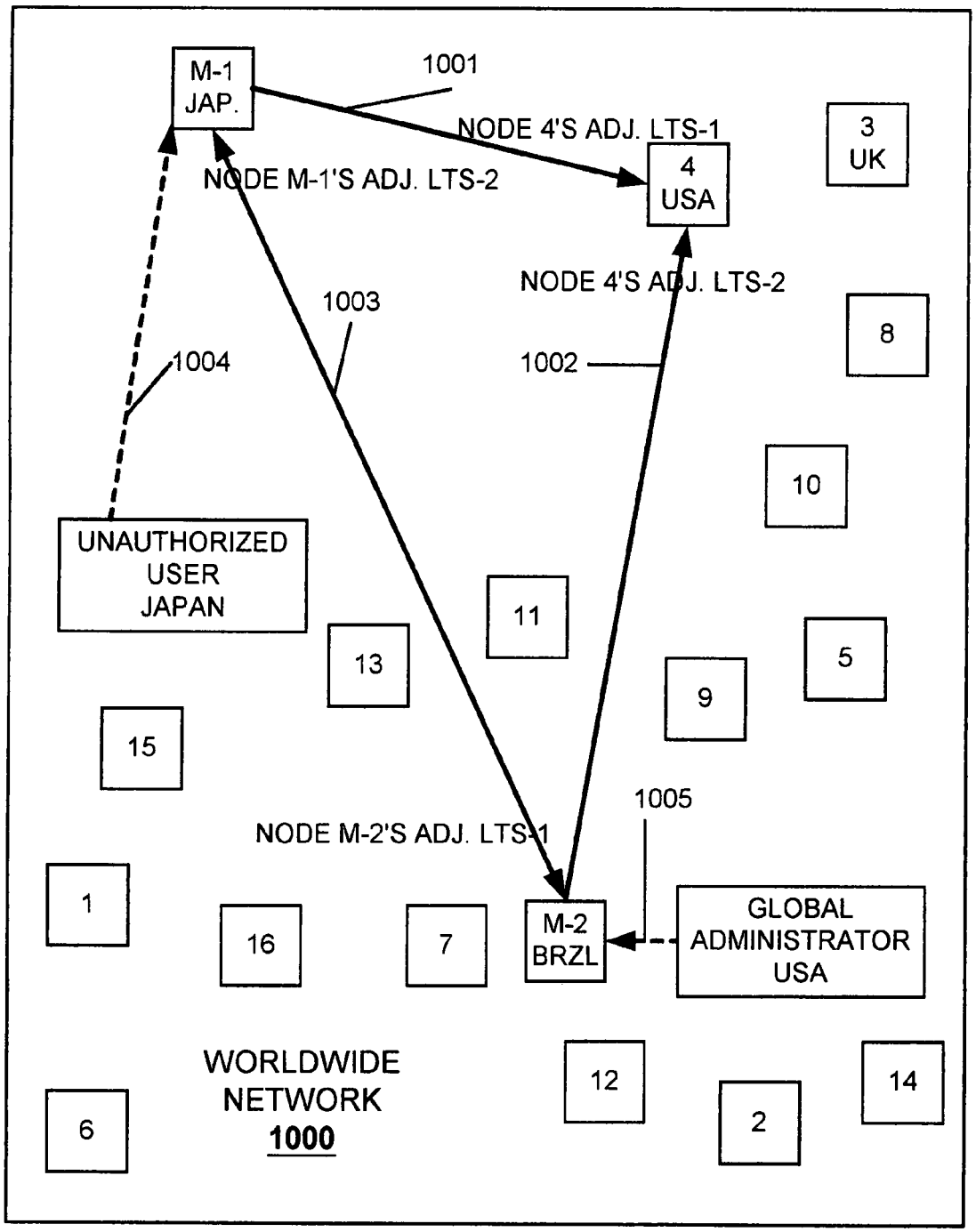
FIG. 10 is a schematic diagram of a global network in which a master to master conflict can be resolved by embodiments of the present invention.

FIG. 10 is a schematic diagram of a global network in which a master node to master node conflict is shown to exist and which can be resolved by operation of embodiments of the present invention. Worldwide network 1000 can be part of the Internet network and nodes 1 through 16 are shown and can be located at any place on the globe. For example, node 3 in the upper right hand corner of the diagram is shown to be located in the UK and node 4 is shown to be located in the USA. Master node M-1 is shown to be located in Japan and master node M-2 is shown to be located in Brazil. The global administrator is shown to be located in the USA and an unauthorized user is shown to be located in Japan. Places of location of each of these nodes and persons is not important to operation of the present invention. And, the present invention will be equally effective if the network was a LAN with few or many nodes and not global in size. Although communication links are not shown between and amongst all depicted nodes to enhance clarity of presentation, it is to be understood that appropriate links do exist. These links, if part of the Internet, could be comprised of any or all of hard wire, optical, telecommunication-via-satellite, and other link components.

In the example shown, a global administrator located in the USA properly selects a node located in Brazil to be master node of this global network. This selection is made via communication link 1005 by way of the dialog of FIG. 8 through the GUI located with the global administrator in the USA, as earlier described. Thereupon, master node M-2 properly announces itself to nodes in its configuration which go through appropriate acknowledgments and handshakes as described hereinabove, after which the configuration (global network) runs properly.

The global administrator, as noted above, is a network user with special privileges. Only this person, or someone under his/her authority, has appropriate password access to the dialog of FIG. 8 to select or appoint a master node. If another user, either subsequently or simultaneously, also selects a different node to be master node, then a conflict results. In this example, a user located in Japan selects a node located in Japan (M-1) to be master node, and this selection is made by way of communication link 1004 through a GUI located in Japan with the unauthorized user. At this point, M-1 announces itself ("I am the master for you") to each of the nodes in the network and the nodes in the network are in conflict because they had been properly aligned to master node M-2 and do not know if they should acknowledge new master node M-1 or not. At this point there is a question or ambiguity about which node is really the master node, whereby both nodes can now be referred to as "purported master" or "contending master" nodes until such ambiguity is removed. However, for purposes of facilitating discussion in connection with FIGS. 10-14, "master" may be used rather than "purported master" in every instance, but a purported master node under a cloud of ambiguity shall be intended until the master conflict is resolved.

When master node M-2 had been selected, in addition to its announcement as master, it had recorded its local Brazilian time of selection (LTS) as master and thereupon starts recording its time duration as master node. Analogously and figuratively speaking, master node M-2 starts its "stop watch" when it is selected as this network's master. Likewise, when unauthorized master node M-1 is selected, in addition to its announcement as master, it records its local Japanese time of selection as master and thereupon starts recording its time duration as master node. In addition to the announcements made to the other nodes in the network by these masters at the times of their respective selections (appointments), each also transmits its respective time duration as master node to all other nodes in the network. These transmissions of time duration are not necessarily coincident with the announcements, and any time delay from time of selection until transmission of the time duration is accounted for in the transmitted time duration value itself.

For example, consider node 4 which is shown with links to both master nodes. Brazilian Master node M-2 sends its time duration value to node 4 in the USA on transmission link 1002 and node 4 subtracts that value from its own local time to achieve an adjusted local time of selection of M-2 as master node (shown as NODE 4's ADJ. LTS-2). Node 4 records this LTS-2 time. Similarly, Japanese master node M-1 sends its time duration value to node 4 in the USA on transmission link 1001 and node 4 also subtracts that value from its own local time to achieve an adjusted local time of selection of M-1 as master node (shown as NODE 4's ADJ. LTS-1). Again, node 4 records this LTS-1 time. As noted, this process (this time duration transmission and subtraction from local time process) involves all nodes in the network. Accordingly, each master node transmits to the other master node over transmission link 1003 its respective time duration. At node M-1, it receives M-2's time duration which is subtracted from local Japanese time to become Node M-1's adjusted LTS-2 which is stored in M-1. Likewise, at node M-2, it receives M-1's time duration which is subtracted from local Brazilian time to become node M-2's adjusted LTS-1 which is stored in M-2. Each node in the global network is thus supplied with temporal information with which it can make a meaningful comparison in its respective local time zone between the absolute time of selection of M-1 and the absolute time of selection of M-2. The detail with respect to this comparison is provided in connection with discussion of flowcharts in FIGS. 11-14 hereinbelow.

FIGS. 11-14

Master to Master Conflict Flowcharts

FIG. 11-14 are flowcharts which depict an algorithm implemented by embodiments of the present invention in resolving master to master conflict. Referring to FIG. 11, in block 1101, a local or worldwide configuration of nodes is managed by its current master node, such as node M-2 in FIG. 10. In block 1102, a node which is not the current master is selected by a network user, resulting in two purported master nodes, node 1 and node 2 at the same time, such as master nodes M-1 and M-2 in FIG. 10. In block 1103, node 1 and node 2 each records its respective local time of selection (LTS) as master node at that respective time and concurrently therewith begins measuring its respective time duration as master. In block 1104, node 1 and node 2 each asserts its master status ("I am the master for you") on the other nodes in the configuration and upon each other when each is selected. Conflict in each of the nodes in the configuration occurs when it receives such an assertion or announcement either while aligned to its master or while it is acting as master. Also, node 1 and node 2 each starts its respective "stop watch" at the time it is selected master to measure its respective time duration as master. In FIG. 10 these announcements are made on transmission links 1001, 1002, 1003, and others (not shown) as earlier discussed. Thereafter, or simultaneously therewith, in block 1105, each transmits its time duration to other nodes in the configuration and to each other on those same links. In block 1106, each node upon receipt of a time duration transmission subtracts such duration from its local time thereby obtaining and storing an adjusted local time of selection (adjusted LTS) of a master node. In a conflict situation as shown here, slave nodes (nodes other than purported master nodes 1 and 2) receive two time duration transmissions and therefore obtain and store two adjusted LTS values, where master nodes 1 and 2 each receive only one time duration transmission from the other master node resulting in obtaining and storing only one adjusted LTS value. The algorithmic process moves from block 1106 via tab "A" to FIG. 12.

In FIG. 12, query block 1201 asks: does each node other than purported master nodes 1 & 2 determine that its adjusted LTS-1 (that node's adjusted local time of selection of master node 1) equals its adjusted LTS-2 (that same node's adjusted local time of selection of master node 2). In addition, the question is also asked of each master node: is its own LTS (each purported master's own local time of selection of itself local Brazilian time for M-2 and local Japanese time for M-1 in FIG. 10) equal to its adjusted LTS of the other master node. In other words, for every node in this configuration, including both master nodes, does each node arrive at the very same conclusion, namely, that the two different selections of the two different master nodes occurred absolutely simultaneously. In still other words, does each node in the network come to the very same conclusion that two selections of two different nodes to be master node of the network occurred within the same global network system clock pulse? [The probability of this event occurring is very low. Even if such singular clock pulse event did occur, variations in transmission time based on transmission link differences from node to node between the purported master nodes and various slave nodes would be likely to cause at least one node to have an opposite conclusion.] On the one hand, if "yes", then a default condition occurs and the algorithmic process moves to question block 1202 where the question is posed: which master has the lower IP address? If node 1's address is less than node 2's address, the algorithmic process moves to block 1203 and node 1 is master. If node 2's address is less than node 1's address, the algorithmic process moves to block 1204 and node 2 is master. Whichever node is not made master returns to participating node status in the configuration. Since every IP address is a unique number, then such a tie-event, although remote, can certainly be broken by these steps. The algorithmic process then moves to block 1205 to bring in any handshaking that may be required after which the process is concluded and the network is again operating under one master. But, on the other hand, if even only one node disagrees on the question of simultaneity in block 1201, then the algorithmic process moves via tab "B" to FIG. 13.

In FIG. 13, tab "B" has input to three question blocks. Question block 1301 handles nodes other than purported master nodes. Question block 1302 handles purported master node 1, and question block 1303 handles purported master node 2. In block 1301, for each node other than the two master nodes, the question is posed: is its adjusted LTS for master node 1 more recent than its adjusted LTS for master node 2? Each slave node that provides a "yes" answer is accounted for in block 1305 which provides a total of yes answers. And, each slave node that provides a "no" answer is accounted for in block 1304 which provides a total of no answers. In block 1302, the question is posed: is master node 1's LTS of itself more recent than master node 1's adjusted LTS of master node 2 (after node 2's time duration has been taken into account). If "yes" that adds to the total number of yes answers in block 1305, but if "no" that adds to the total number of no answers in block 1304. Finally, in block 1303, the question is posed: is master node 2's LTS of itself more recent than master node 2's adjusted LTS of master node 1 (after node 1's time duration has been taken into account). If "yes" that adds to the number of no answers in block 1304, but if "no" that adds to the number of yes answers in block 1305. In this manner each node in the configuration contributes to either the total number of nodes which measured purported master node 1 as being more recently selected as master than purported master node 2 or contributes to the total number of nodes which measured purported master node 2 as being more recently selected as master than purported master node 1. It should be understood that in the normal course of operation of a network of this type, if there is a master to master conflict, the overwhelming likelihood is that the two masters would have been selected at times that were vastly different from each other—minutes, hours, days, weeks, months, or longer times could separate the two times of selection. Under these more ordinary conditions, output from block 1305 would total "yes 100%" while output from block 1304 would total "no 0%", or vice versa. The totals from blocks 1304 and 1305 are directed to tab "C" which connects to the input of FIG. 14.

In FIG. 14, totals from blocks 1304 and 1305 are compared in block 1401 and the result is input to question block 1402. On the one hand, in block 1402, if there is a tie yes/no count, (again, an extremely unlikely event) the algorithmic process moves to question block 1406 where, as before, IP addresses of both purported master nodes are compared to determine the purported master node having the lower of the two IP addresses, and that purported master node is made master in blocks 1407 or 1408. (Alternatively, the higher IP address could have been used.) On the other hand, if there is no tie count, the algorithmic process moves to question block 1403 to determine if the total number of nodes in the configuration that measure purported master node 1's time of selection as master being more recent than purported master node 2's time of selection, is greater or less than the total number of nodes in the configuration that measure purported master node 2's time of selection as master being more recent than purported master node 1's time of selection. If node 1 has a greater total, then node 1 is made master in block 1405, but if node 2 has a greater total, then node 2 is made master in block 1404. Thereafter, whichever result is obtained from either blocks 1404, 1405, 1407, or 1408, that result is subjected to handshaking in block 1409 in accordance with FIGS. 6 and/or 7, after which the algorithmic process stops. It should be understood that if more than two masters are in conflict, the above procedure can be used to resolve conflict between two of them at a time in accordance with the foregoing description until the conflict is completely resolved.

The present embodiments are to be considered in all respects as illustrative and not restrictive. The flowcharts used herein to demonstrate various aspects of the invention should not be construed to limit the present invention to any particular logic flow or logic implementation. For example, the alternative embodiment of the master to node handshake as depicted in FIG. 6A, shows that described logic may be combined or partitioned into different logic blocks, (e.g., programs, modules, functions, or subroutines) without changing the overall results or otherwise departing from the true scope of the invention. The present invention may thus be embodied in many different forms, including, but not limited to, computer program logic for use with any kind of processor, programmable logic for use with any kind of programmable logic device, discrete components, integrated circuitry including application specific integrated circuits (ASICs), or any other means including any combination thereof. Computer program logic implementing all or part of the functionality described herein may be embodied in various forms, including, but not limited to, source code form, computer executable form, and various intermediate forms (e.g. forms generated by an assembler, compiler, linker, or locator.) Source code may include a series of computer program instructions implemented in any of various programming languages for use with various operating systems or operating environments. The source code may define and use various data structures and communication messages. The source code may be in computer executable form, or it may be in a form convertible into computer executable form. The computer program may be fixed in any form either permanently or transitorily in a tangible storage medium, such as a semiconductor memory device, a magnetic memory device, an optical memory device, a PC card, or other memory device. The computer program many be fixed in any form in a signal that is transmittable to a computer using any of various communication technologies including, but not limited to, analog, digital, optical, wireless, networking, and internetworking technologies. The computer program may be distributed in any form as a removable storage medium with accompanying printed or electronic documentation, preloaded with a computer system (e.g. on system ROM or fixed disk), or distributed from a server or electronic bulletin board over the communication system (e.g., the Internet or World Wide Web).

The present invention may be used in any network environment where a distributed directory database is needed or utilized, such network being used for any purpose including, but not limited to, computer data storage. Furthermore, although embodiments of the present invention include C++ and JAVA object oriented software, other software could be utilized. Therefore, the scope of the invention is indicated by the appended claims rather than by the foregoing description, and all changes which come within the meaning and range of equivalency of the claims are intended to be embraced therein.

What is claimed is:

1. In a computer network having a plurality of nodes including a first master node and a second master node, a system for resolving conflict in said network between said first master node and said second master node comprising:
    means for establishing a standard for comparison between said first master node and said second master node;
    means for comparing said first master node against said second master node in accordance with said standard to obtain comparison results;
    wherein said comparing means comprises:
        means for choosing between said first master node and said second master node if said first master node and said second master node were selected simultaneously; and,
        means for determining which one of said first master node and said second master node was most recently selected to obtain a most recently selected master node if said first master node and said second master node were not selected simultaneously; and,
    means for selecting said master node from the group of nodes consisting of said first master node and said second master node based on said comparison results.

2. In a computer network having a plurality of nodes including a first master node and a second master node, a method for resolving conflict in said network between said first master node and said second master node comprising:
    establishing a standard for comparison between said first master node and said second master node;
    comparing said first master node against said second master node in accordance with said standard to obtain comparison results;
    wherein said comparing comprises:
        choosing between said first master node and said second master node if said first master node and said second master node were selected simultaneously; and,
        determining which one of said first master node and said second master node was most recently selected to obtain a most recently selected master node if said first master node and said second master node were not selected simultaneously; and,
    selecting said master node from the group of nodes consisting of said first master node and said second master node based on said comparison results.

3. A computer program product for use in a computer network having a plurality of nodes including a first master node and a second master node, said computer program product including a computer usable medium having computer readable program code thereon for resolving conflict in said network between said first master node and said second master node, said program code comprising:

program code for establishing a standard for comparison between said first master node and said second master node;

program code for comparing said first master node against said second master node in accordance with said standard to obtain comparison results;

wherein said comparing program code comprises:

program code for choosing between said first master node and said second master node if said first master node and said second master node were selected simultaneously; and, program code for determining which one of said first master node and said second master node was most recently selected to obtain a most recently selected master node if said first master node and said second master node were not selected simultaneously; and, program code for selecting said master node from the group of nodes consisting of said first master node and said second master node based on said comparison results.

* * * * *